(12) United States Patent
Locke et al.

(10) Patent No.: US 12,234,418 B2
(45) Date of Patent: Feb. 25, 2025

(54) HYDROCARBON STREAM SEPARATION SYSTEM AND METHOD

(71) Applicant: CARBOVATE DEVELOPMENT CORP., Sarnia (CA)

(72) Inventors: Gary Locke, Calgary (CA); Edward Brost, Brights Grove (CA)

(73) Assignee: CARBOVATE DEVELOPMENT CORP., Sarnia (CA)

( * ) Notice: Subject to any disclaimer, the term of this patent is extended or adjusted under 35 U.S.C. 154(b) by 623 days.

(21) Appl. No.: 17/665,478

(22) Filed: Feb. 4, 2022

(65) Prior Publication Data

US 2022/0154081 A1   May 19, 2022

Related U.S. Application Data

(63) Continuation-in-part of application No. 17/396,302, filed on Aug. 6, 2021, now Pat. No. 11,274,255.

(60) Provisional application No. 63/063,010, filed on Aug. 7, 2020.

(51) Int. Cl.

| | |
|---|---|
| *C10G 7/06* | (2006.01) |
| *B01D 3/00* | (2006.01) |
| *B01D 3/10* | (2006.01) |
| *B01D 3/38* | (2006.01) |
| *B01D 5/00* | (2006.01) |
| *C10C 3/06* | (2006.01) |
| *C10G 1/02* | (2006.01) |

(52) U.S. Cl.
CPC ............ *C10G 7/06* (2013.01); *B01D 3/007* (2013.01); *B01D 3/10* (2013.01); *B01D 3/38* (2013.01); *B01D 5/0039* (2013.01); *B01D 5/006* (2013.01); *C10C 3/06* (2013.01); *C10G 1/02* (2013.01)

(58) Field of Classification Search
CPC .............................. C10G 7/06; C10G 2400/06
See application file for complete search history.

(56) References Cited

U.S. PATENT DOCUMENTS

| | | | |
|---|---|---|---|
| 10,808,186 B2 | 10/2020 | Yusuf et al. | |
| 10,920,153 B2 | 2/2021 | Corscadden et al. | |
| 11,001,760 B2 | 5/2021 | Corscadden et al. | |
| 2017/0204336 A1* | 7/2017 | Bhatia | ............... C10G 7/00 |
| 2019/0344195 A1* | 11/2019 | Golden | ............... B01D 3/14 |

* cited by examiner

*Primary Examiner* — Randy Boyer

(57) ABSTRACT

A system and method for separating a hydrocarbon feed stream by flashing the feed stream under vacuum to form a remaining flashed vapor comprising atmospheric hydrocarbons, vacuum distillable hydrocarbons and a non-volatile liquid; condensing the flashed vapor to a liquid using a two-stage condenser and heat recovery system; and recycling a portion of the condensed liquid to be flashed under vacuum. Separation is accomplished by combining atmospheric and vacuum separation in one column. The non-volatile liquid recovered from the vacuum vessel may comprise asphalt. This process also injects steam generated within the process into the vacuum vessel which is condensed in a two-stage condenser system to augment vacuum and aid in separation. The feed stream may comprise diluted bitumen which may be removed using a feed preparation vessel.

20 Claims, 18 Drawing Sheets

HYDROCARBON STREAM SEPARATION SYSTEM AND METHOD

CROSS-REFERENCE TO RELATED APPLICATIONS

This application is a Continuation-in-part of U.S. application Ser. No. 17/396,302 filed on Aug. 6, 2021, which claims the benefit of U.S. Provisional Application No. 63/063,010 filed Aug. 7, 2020; and this application herein by reference incorporates the entire contents of all the above cited applications.

TECHNICAL FIELD

This disclosure relates generally to the field of hydrocarbon stream separation of bitumen-based feedstocks, and more particularly, to the production of high carbon content products, such as asphalt cement, and lighter carbon content products.

BACKGROUND

Bitumen produced from oil sands is a useful feedstock for asphalt cement production since bitumen is mostly comprised of non-volatile hydrocarbon molecules. Bitumen-based feedstock is, therefore, an economical feedstock for production of asphalt cement as well as other secondary useful products such as diluent, LVGO, MVGO, HVGO. Asphaltic crudes containing a low yield of these heavy molecules would not make enough asphalt cement product to be economically feasible. A producer would need to make most of their money on the balance of the barrel (fuels) to be viable.

That said, most bitumen produced from mining, thermal recovery or solvent recovery processes contains some lighter native components that must be removed to meet the various grades of asphalt cement desired in commercial markets. In addition, due to natural bitumen's extremely high viscosity, naphtha solvents referred to as diluents, may need to be added to bitumen to improve flowability and facilitate transfer from the production fields to downstream processing plants.

Asphalt cement production using this diluted bitumen as feedstock must first separate the diluents and remove lighter boiling components native in the bitumen to meet the Atmospheric Equivalent Temperature (AET) specification as well as other industry specifications such as penetration and viscosity. In an illustrative example, only larger-scale and/or geographically distributed facilities can minimize costs of transporting the finished asphalt to local markets, placing small-scale facilities at a competitive disadvantage.

In comparing diluted or undiluted bitumen to crude oil, crude oil generally contains a broader range of hydrocarbons than diluted or undiluted bitumen. In an illustrative example, hydrocarbons contained in crude oil may be fractionated to produce useful products such as gasoline, kerosene, furnace oil, jet fuel, diesel fuel and fuel oils. The economics of such crude oil processing are largely tied to the quantities of these liquid products the crude produces. Bitumen-based feedstock is generally less desirable because it typically does not naturally contain appreciable quantities of these volatile liquid fuels and fuel precursors. Both crude oil and bitumen contain a fraction of non-volatile molecules which cannot be fractionated. For example, bitumen's content of non-volatiles may approach the range of 70-75% by volume and some very heavy crude oils may have non-volatile fractions higher than 50% by volume. While the value of bitumen and other heavy crude oils are inherently limited regarding fuel, they do remain valuable as potential sources of asphalt cement and other products. These include, for example, carbon, other high-carbon materials such as adhesives, sealants and coatings and other advanced materials.

An asphalt producer's business model may be based on an ability to produce the various grades of products required by the fossil fuel marketplace. This is in contrast with a crude oil processor, that may seek to maximize the volume and separation of the hydrocarbons into the various liquid product fractions. To maximize the volume and separation of the hydrocarbons from crude oil into the various liquid product fractions, and to do this economically, the non-volatiles must be thermally or catalytically decomposed or cracked into lighter molecules that increase yields of their liquid products from the crude feedstock. This adds complexity and cost that often only scale can counterbalance economically.

Typically, the removal of light hydrocarbons at atmospheric pressure is preferred since these compounds are condensable at ambient conditions. If allowed to enter a vacuum system, such compounds are difficult to condense and require enlargement of vacuum vessels and piping to accommodate their physical volumes. For this reason, a typical crude oil distillation unit is comprised of two distillation columns. The first column fractionates and removes hydrocarbons that can be vaporized and are condensable under approximately ambient pressure conditions. Heavier hydrocarbon components have boiling points that are above their coking temperatures. To avoid coking the long residue exiting the atmospheric column is heated to near coking temperatures and then admitted to the second distillation column operating under vacuum. At the reduced pressure and elevated, near coking, temperature, the volatile material in the vacuum column feed flashes to a vapor state. Coking of hydrocarbons may occur in a range of temperatures from 650° F.-750° F. Hydrocarbons of higher molecular weight are condensable under vacuum conditions. So optimal sizing of the vacuum environment requires removing non-condensable vapors under a vacuum column in an upstream atmospheric column; but subjecting even non-volatile hydrocarbons to the vacuum environment often creates mechanical entrainment of liquid droplets with the flashing vapor phase. What is needed is an economical system and method for a bitumen-based feedstock stream separation to produce asphalt and other useful products.

SUMMARY

Herein disclosed is a system and method for separating a hydrocarbon feed stream by flashing the feed stream under vacuum to form a remaining flashed vapor comprising atmospheric hydrocarbons, vacuum distillable hydrocarbons, and a non-volatile liquid; condensing the flashed vapor to a liquid using a two-stage condenser and heat recovery system; and recycling a portion of the condensed liquid to be flashed under vacuum. Separation is accomplished by combining atmospheric and vacuum separation in one column. The non-volatile liquid recovered from the vacuum vessel may comprise asphalt. This process also injects steam generated within the process into the vacuum vessel which is condensed in a two-stage condenser system to augment vacuum and aid in separation. The feed stream may comprise diluted bitumen which may be removed using a feed preparation vessel. The details of these aspects of the invention are set forth in the accompanying drawings and the detailed description below. Other features and advantages will be apparent from the description, drawings and claims.

DETAILED DESCRIPTION

Like reference symbols in the various drawings indicate like elements.

Figure 4:
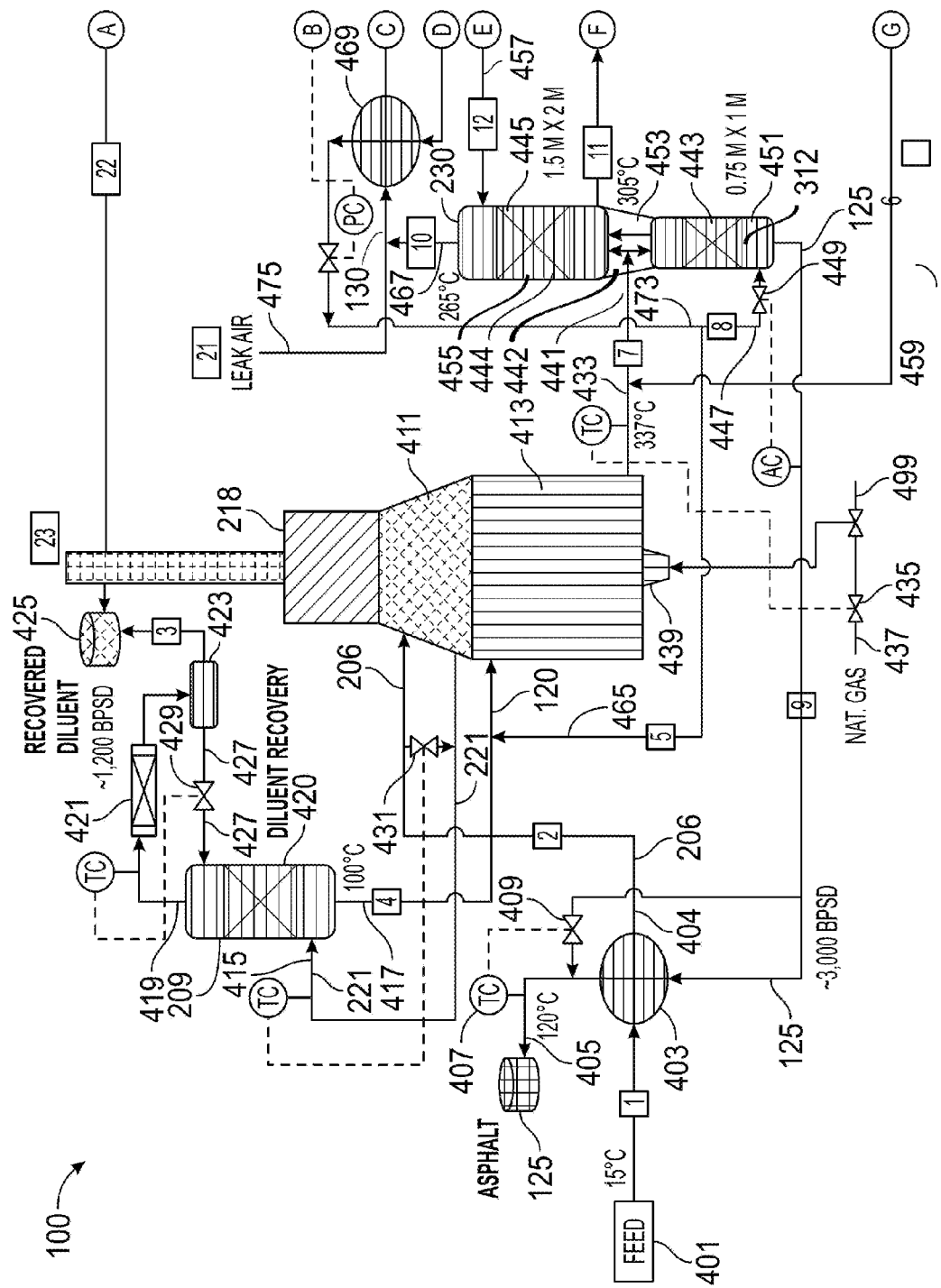
FIG. 4 depicts a schematic view of an exemplary hydrocarbon stream separation apparatus implementation illustrating exemplary feed preparation, asphalt separation and recovery subsystems.
Figure 4:
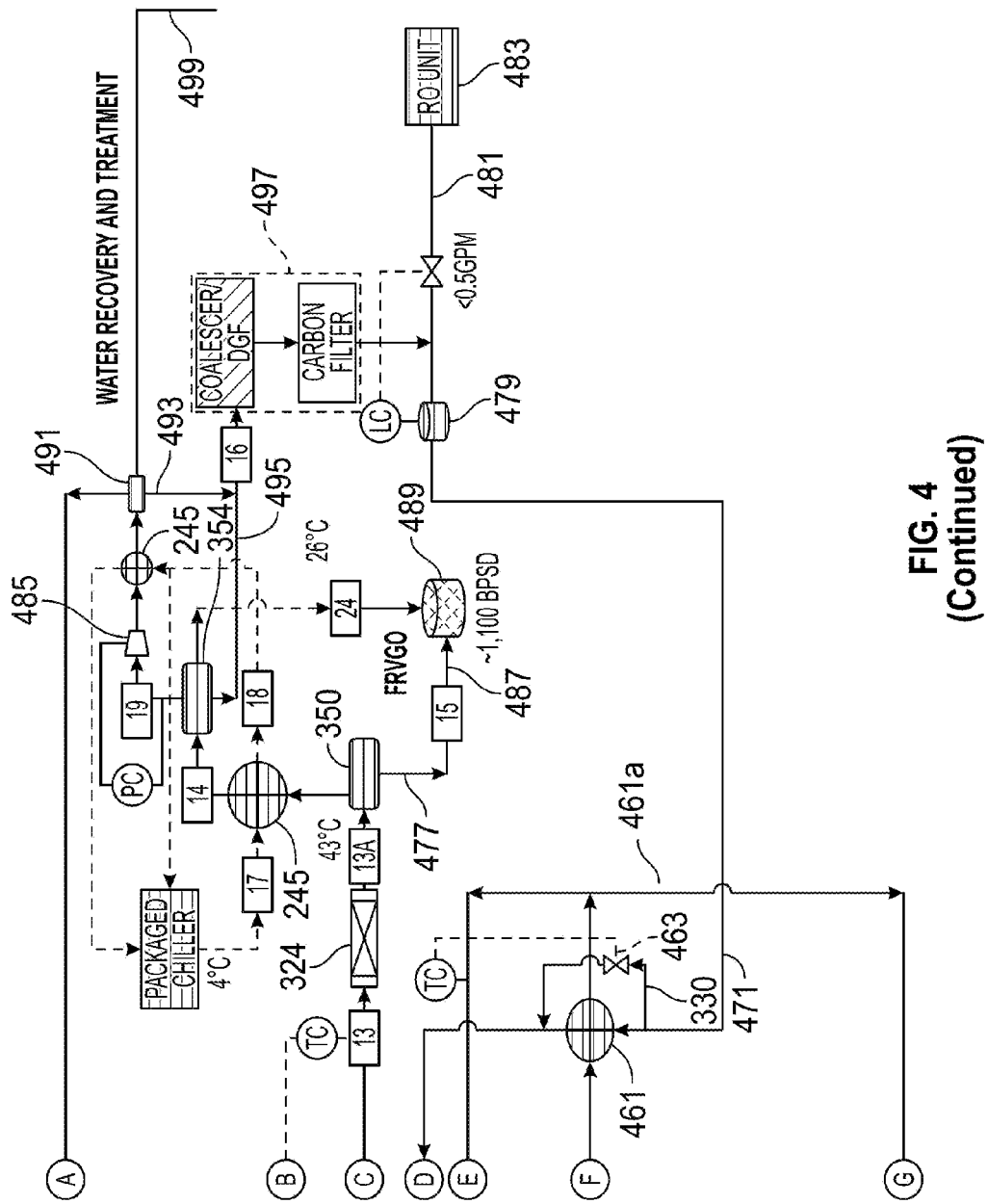
Figure 5:
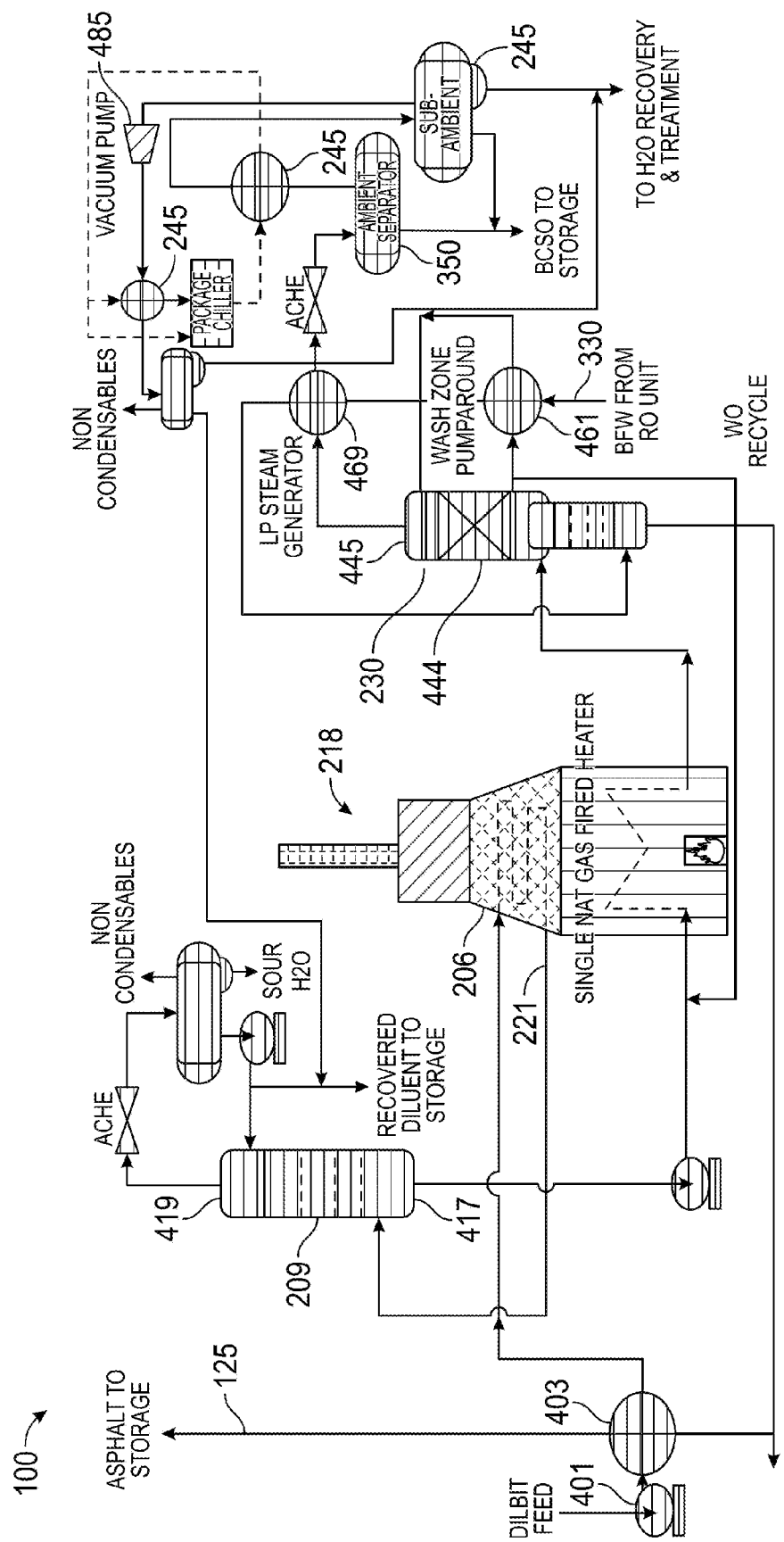
FIG. 5 depicts a schematic view of an exemplary hydrocarbon stream separation apparatus implementation illustrating exemplary feed preparation and asphalt separation subsystems.
Figure 6:
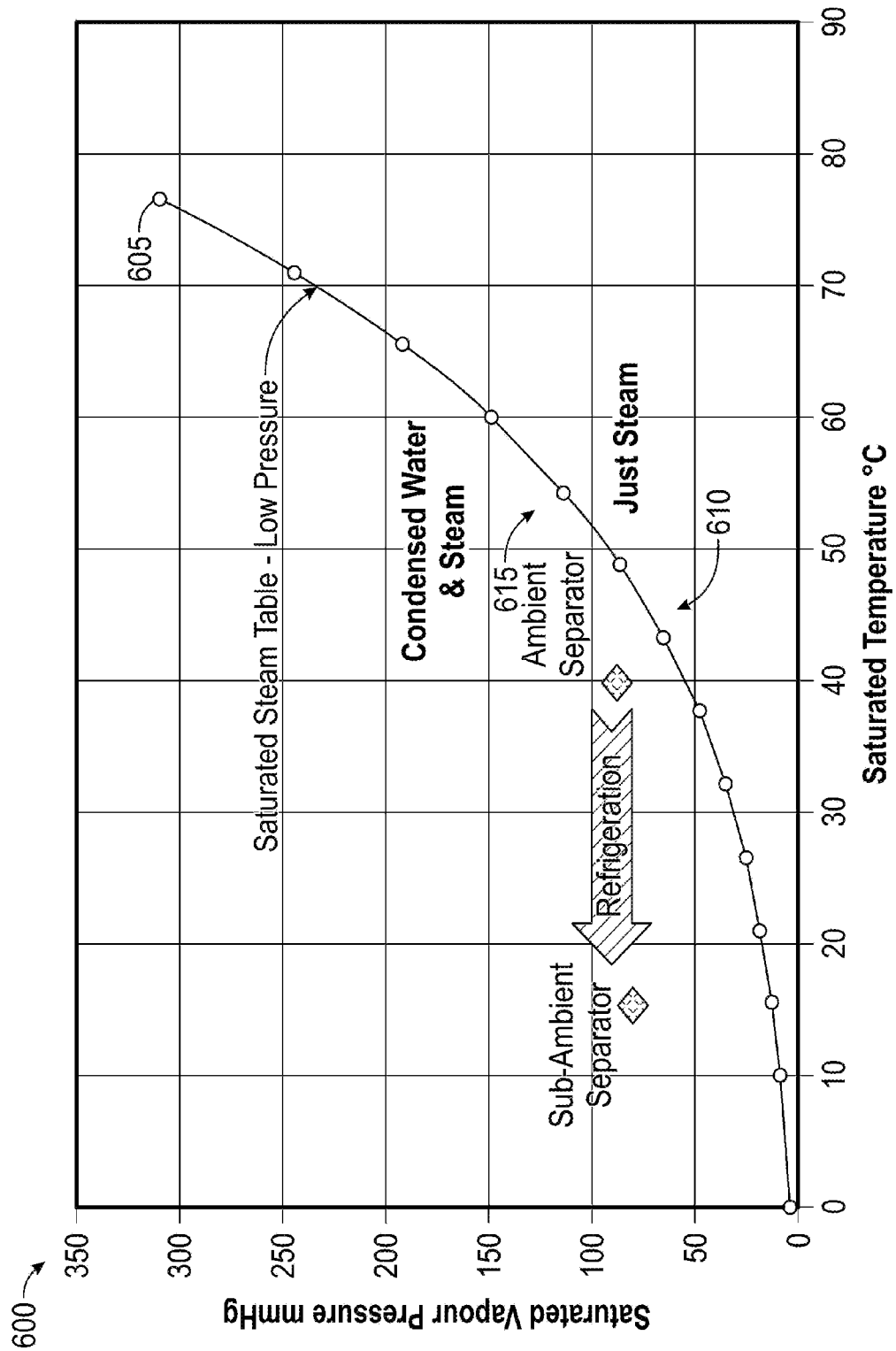
FIG. 6 is a graph view depicting an illustrative example of the effect of refrigeration on steam in an exemplary thermodynamic system.

To aid understanding, this document is organized as follows. First, hydrocarbon stream separation is briefly introduced with reference to FIG. 1. With reference to FIGS. 2A-3E, the discussion turns to exemplary implementations of apparatus design that illustrate hydrocarbon stream separation including exemplary feed preparation, asphalt separation and recovery unit. With reference to FIGS. 4-5, illustrative implementations explain improvements in the hydrocarbon stream separation technology. With reference to FIG. 6, an example of the effect of refrigeration on steam is presented to describe a technical effect achieved by at least one exemplary design. Finally, with reference to FIG. 7, an exemplary hydrocarbon stream separation implementation using an electrically energized heater is disclosed, to present a design featuring reduced Green House Gas (GHG) emissions.

Figure 1:
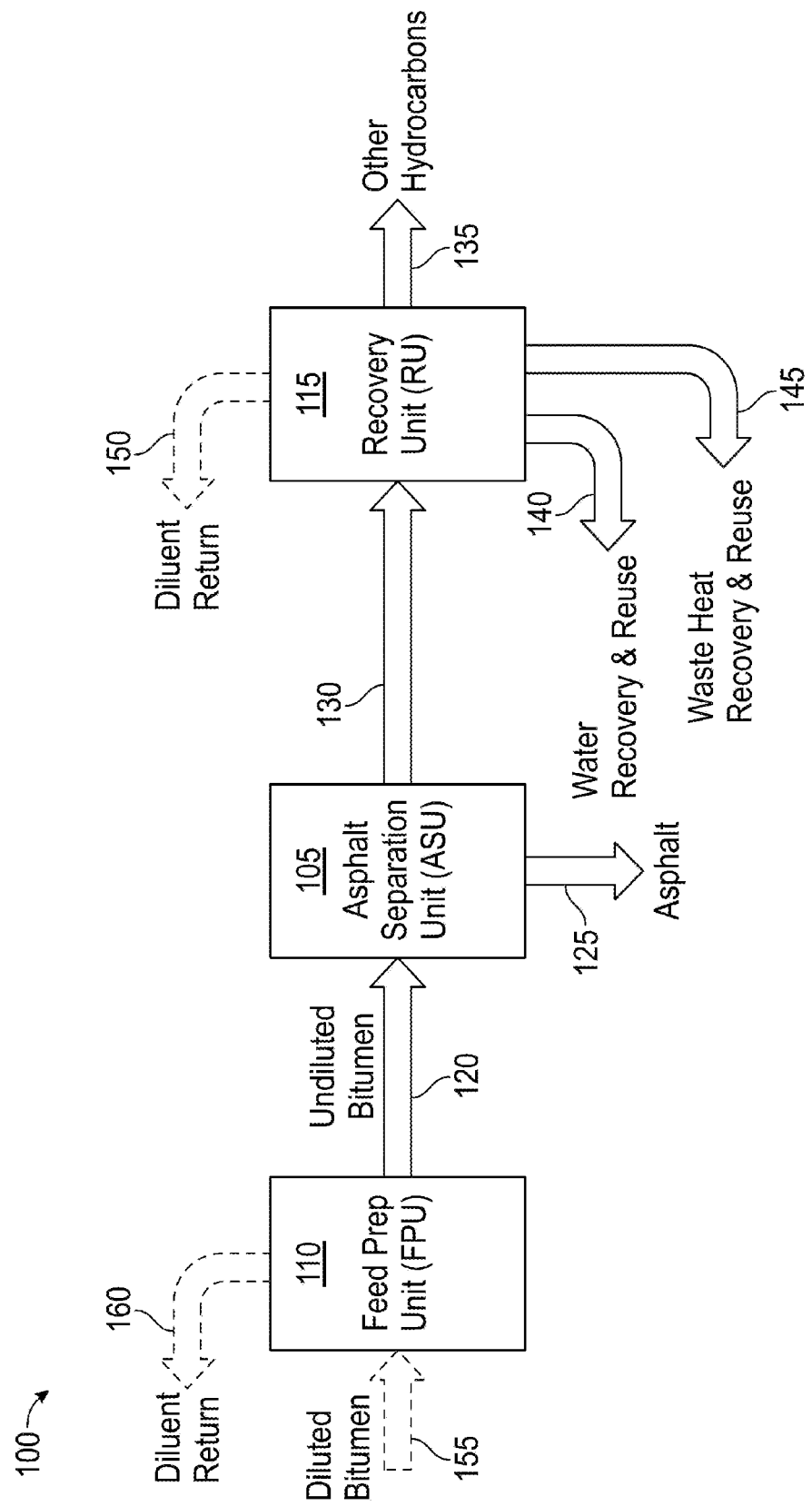
FIG. 1 depicts a block diagram view of an exemplary hydrocarbon stream separation apparatus.

FIG. 1 depicts a block diagram view of an exemplary hydrocarbon stream separation apparatus configured to separate a hydrocarbon feed stream based on flashing the feed stream at near atmospheric pressure, flashing the remaining stream under vacuum to form a flashed vapor while leaving behind a non-volatile liquid, and condensing the flashed vapor to a liquid. In FIG. 1, the depicted exemplary hydrocarbon stream separation system 100 includes the asphalt separation unit (ASU) 105, the feed preparation unit (FPU) 110 and the recovery unit (RU) 115. In the illustrated implementation, the ASU 105 is operably coupled with the FPU 110 to receive an undiluted bitumen feed via the undiluted feed inlet 120. In the depicted implementation, the ASU 105 separates the undiluted bitumen feed into a product stream comprising non-volatile liquid (453) exited via a product outlet 125 and a by-product stream (hereafter interchangeably referred to as a "remaining stream" and/or a "wash zone vapor phase") 445 exited via a vacuum overhead stream outlet 130. The product stream may comprise asphalt. The by-product stream 445 may comprise an atmospheric distillable hydrocarbon stream, a vacuum distillable hydrocarbon stream and one or more by-products. In the illustrated example, the ASU 105 emits asphalt product from the product outlet 125 and emits the by-product stream from the vacuum overhead stream 130 outlet into the recovery unit (115).

In the illustrated example, the by-product exited via the vacuum overhead stream outlet 130 may include water and mixed hydrocarbons separated by the ASU 105 from the undiluted bitumen feed. In the illustrated example, the RU 115 recovers multiple by-products via the vacuum overhead stream outlet 130 received from the ASU 105. In the depicted implementation, the RU 115 emits mixed hydrocarbons recovered from the vacuum overhead stream outlet 130 by the RU 115. In the illustrated example, the RU 115 emits the recovered mixed hydrocarbons via the mixed by-product outlet 135. An exemplary RU 115 may separate the recovered mixed hydrocarbons into multiple other by-product streams such as but not limited to water and waste heat. In the illustrated example, the RU 115 recovers water from the by-product stream via the vacuum overhead stream outlet 130 received from the ASU 105.

In the depicted implementation, the RU 115 emits the water recovered from the vacuum overhead stream outlet 130 by the RU 115. In the illustrated example, the RU 115 emits the recovered water via the water recovery and reuse outlet 140. The recovered water may be used by the hydrocarbon stream separation system 100. An exemplary RU 115 may comprise an inlet configured to receive a stream comprising water. An exemplary RU 115 may be configured to heat a received water stream using heat recovered from the by-product vacuum overhead stream.

In the illustrated example, the RU 115 recovers heat from the by-product via the vacuum overhead stream outlet 130 received from the ASU 105. In the depicted implementation, the RU 115 emits the heat recovered from the by-product via the vacuum overhead stream outlet 130 by the RU 115. In the illustrated example, the RU 115 emits the recovered heat via the waste heat recovery and reuse outlet 145. The recovered heat may be used by the hydrocarbon stream separation system 100. In some implementations, the RU 115 may recover diluent from the by-product stream via the vacuum overhead stream outlet 130 received from the ASU 105. An exemplary RU 115 may emit diluent recovered from the by-product via the vacuum overhead stream outlet 130 by the RU 115. The RU 115 may emit the recovered diluent via the RU diluent return 150. In the depicted implementation, the FPU 110 receives a diluted bitumen feed via the diluted feed inlet 155. The illustrated FPU 110 removes diluent from the diluted bitumen feed based on flashing at near atmospheric pressure and delivers the undiluted bitumen feed to the ASU 105 via the undiluted feed inlet 120. The depicted FPU 110 may emit the removed diluent via the FPU diluent return 160.

FIGS. 2A-2F depict block diagram views of exemplary hydrocarbon stream separation apparatus subsystems.

Figure 2A:
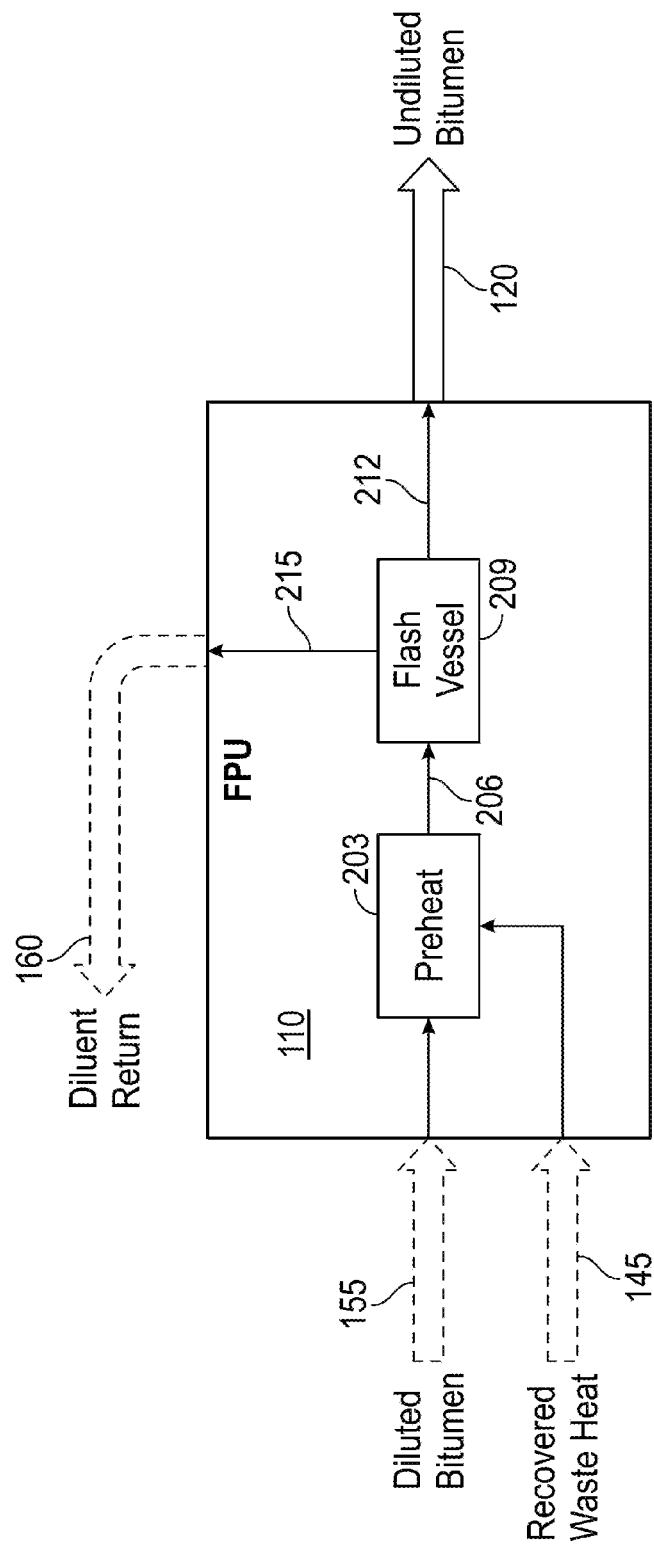
FIGS. 2A-2F depict block diagram views of exemplary hydrocarbon stream separation apparatus subsystems.

In FIG. 2A, the exemplary FPU 110 comprises the preheat section 203 configured to preheat diluted bitumen and emit the preheated feed 206 to the flash vessel 209. In the depicted example, the flash vessel 209 is configured to separate the preheated feed 206 into the undiluted bitumen stream 212 and the diluent stream 215. The flash vessel 209 may comprise a flash column.

Figure 2B:
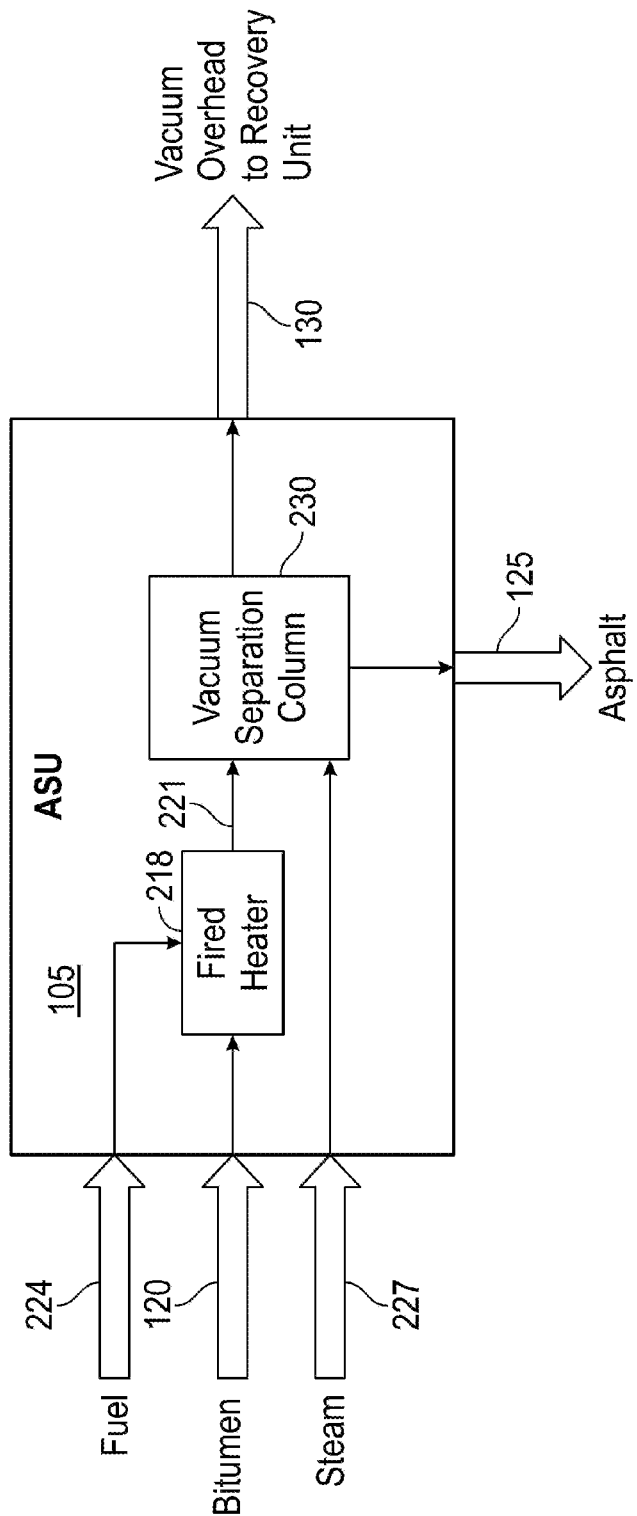

In FIG. 2B, the exemplary ASU 105 comprises the fired heater 218 configured to heat a bitumen feed and emit the heated feed 221. In the implementation depicted by FIG. 2B, the bitumen feed may comprise diluted bitumen. In the implementation depicted by FIG. 2B, the bitumen feed may comprise undiluted bitumen. The fired heater 218 may comprise a burner. The fired heater 218 burner may be supplied with fuel via the fuel inlet 224. In the depicted example, steam received via the steam inlet 227 is supplied to a vacuum separation column 230. The illustrated vacuum separation column 230 receives the heated feed 221 from the fired heater 218. In the depicted example, the vacuum separation column 230 separates the heated feed 221 into a product stream and a by-product vacuum overhead stream. In the depicted implementation, the product stream is an asphalt stream emitted via the product outlet 125. In the illustrated implementation, the by-product vacuum overhead stream is emitted via the vacuum overhead outlet 130. The vacuum overhead stream may comprise a mixed hydrocarbon stream. The vacuum overhead outlet 130 may be operably coupled to a recovery unit.

Figure 2C:
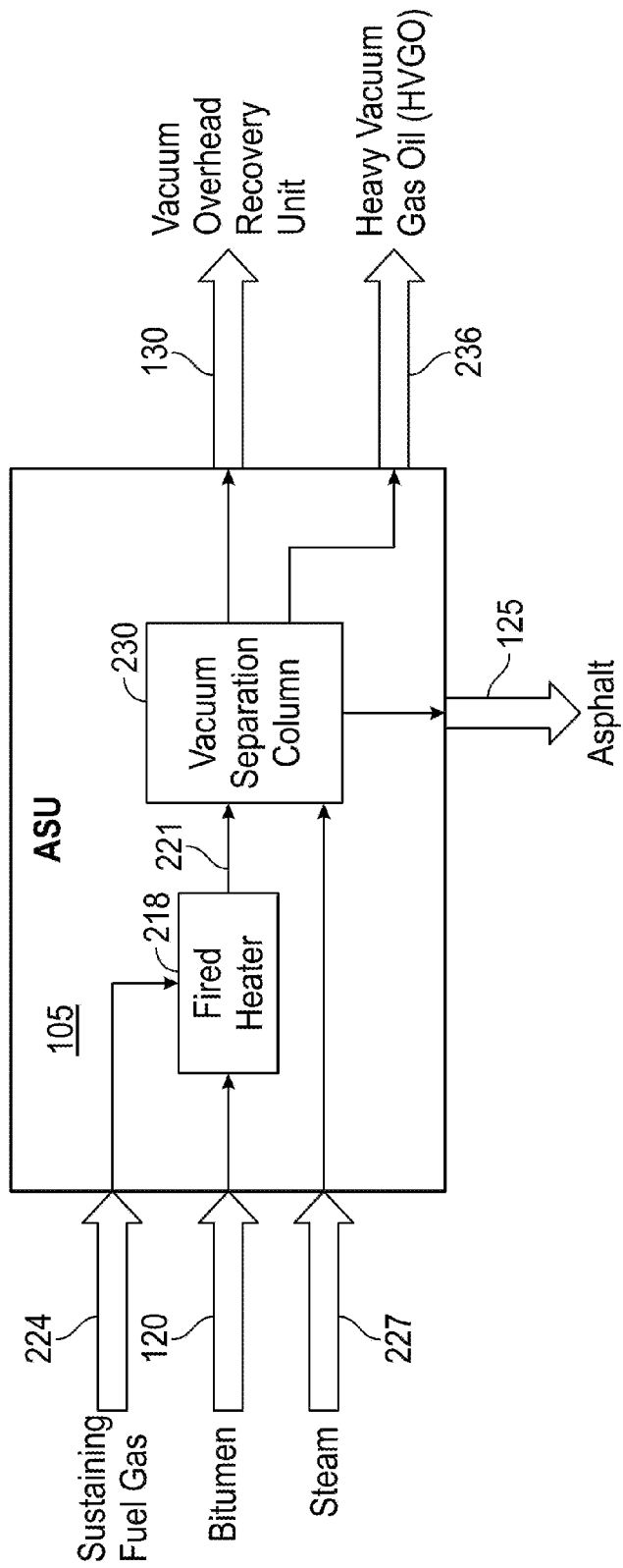

In FIG. 2C, the exemplary ASU 105 vacuum separation column 230 is configured to separate the heated feed 221 into a product stream, a by-product vacuum overhead stream and at least one other by-product stream. In the depicted example, the vacuum separation column 230 separates the heated feed 221 into the asphalt stream emitted via the product outlet 125, the by-product vacuum overhead stream emitted via the vacuum overhead outlet 130 and a heavy vacuum gas oil stream emitted via the heavy vacuum gas oil (HVGO) stream outlet 236. In the depicted implementation, fuel supplied to the fired heater 218 via the fuel inlet 224 is sustaining fuel gas. The sustaining fuel gas may be fuel gas recovered by an exemplary hydrocarbon stream separation apparatus as a result of processing the bitumen feed.

Figure 2D:
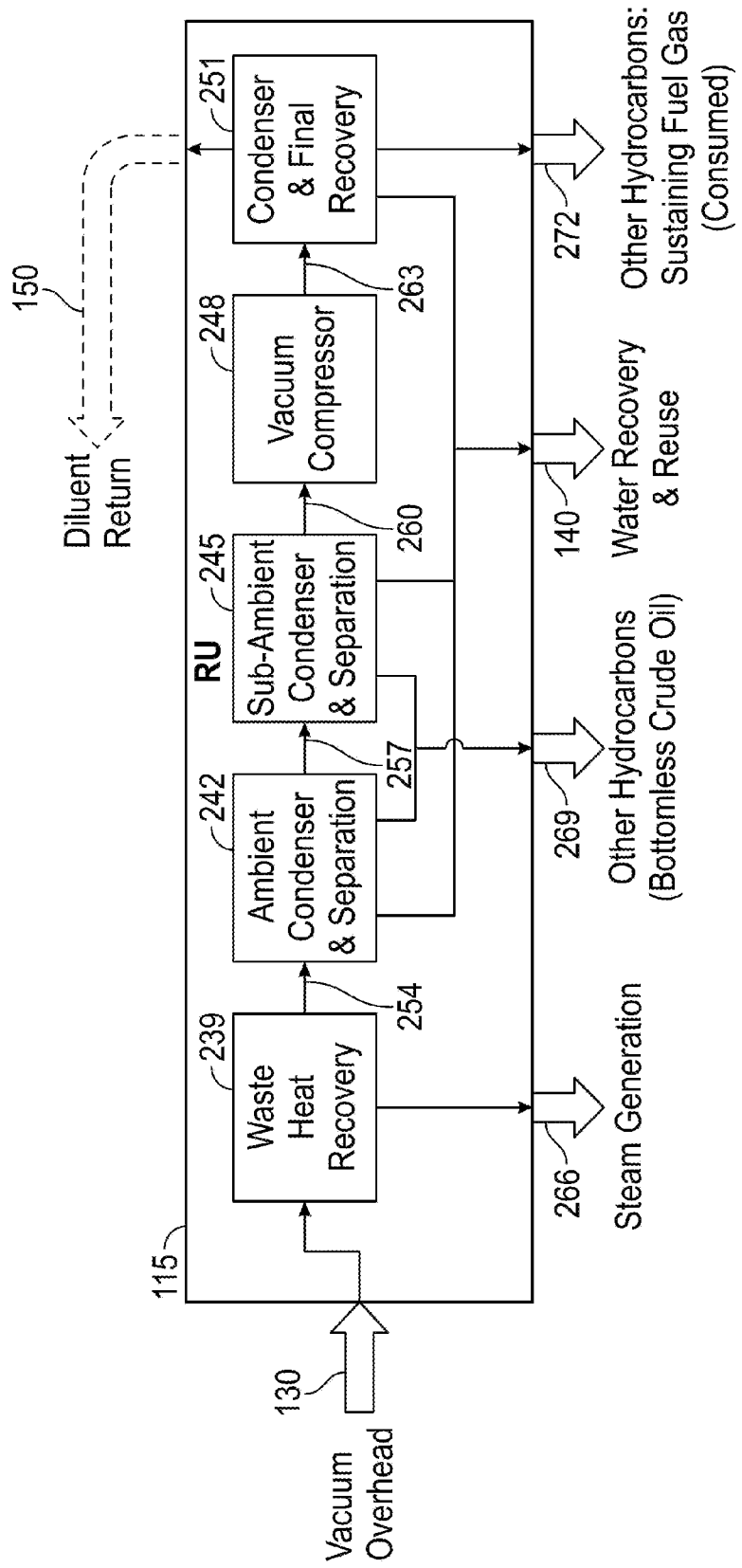

In FIG. 2D, the exemplary RU 115 comprises the waste heat recovery 239 section configured to recover heat from the by-product vacuum overhead stream received by the RU 115. The heat recovered by the waste heat recovery 239 section may be process heat resulting from operation of an exemplary hydrocarbon stream separation apparatus. The waste heat recovery section 239 may comprise a heat exchanger. The illustrated RU 115 further comprises the ambient condenser and separation section 242, the sub-ambient condenser and separation section 245, the vacuum compressor 248 and the condenser and final recovery section 251.

In the depicted implementation, the waste heat recovery section 239 recovers heat, vapor, and condensed liquids from the by-product vacuum overhead stream. The illustrated waste heat recovery section 239 supplies the vacuum overhead vapor and condensed liquids stream 254 to the ambient condenser and separation section 242. The depicted waste heat recovery section 239 emits the heat recovered via the steam outlet 266. In the depicted example, the recovered heat is used for steam generation. In the illustrated implementation, the sub-ambient condenser and separation section 245 receives the vacuum overhead ambient cooled vapor stream 257 from the ambient condenser and separation 242. The illustrated ambient condenser and separation section 242 and the sub-ambient condenser and separation section 245 together in combination emit a wide cut mixed by-product stream 269.

An exemplary implementation may comprise one or more valves configured to control the contribution of each of the condenser and separation section 242 and the sub-ambient condenser and separation section 245 to the wide cut mixed by-product stream 269. The wide cut mixed by-product stream 269 may comprise bottomless crude oil. In the illustrated implementation, the vacuum compressor 248 receives the vacuum overhead sub-ambient cooled vapor stream 260 from the sub-ambient condenser and separation section 245. The depicted vacuum compressor 248 supplies the vacuum overhead compressed vapor stream 263 to the condenser and final recovery section 251. In the depicted implementation, the ambient condenser and separation section 242, the sub-ambient condenser and separation section 245 and the condenser and final recovery section 251 together in combination emit recovered water via the water recovery and reuse stream outlet 140.

An exemplary implementation may comprise one or more valves configured to govern the contribution of each of the condenser and separation section 242, the sub-ambient condenser and separation section 245 and the condenser and final recovery section 251 to the recovered water emitted via the water recovery and reuse stream outlet 140. In the illustrated implementation, the condenser and final recovery section 251 emits the fuel gas stream 272. In the depicted example, the fuel gas stream 272 comprises sustaining fuel gas. In some implementations, the condenser and final recovery section 251 may emit recovered diluent. The exemplary RU 115 may comprise the ambient condenser and separation 242 section coupled to the vacuum compressor 248. In some RU 115 implementations, the sub-ambient condenser and separation 245 section may be optional.

Figure 2E:
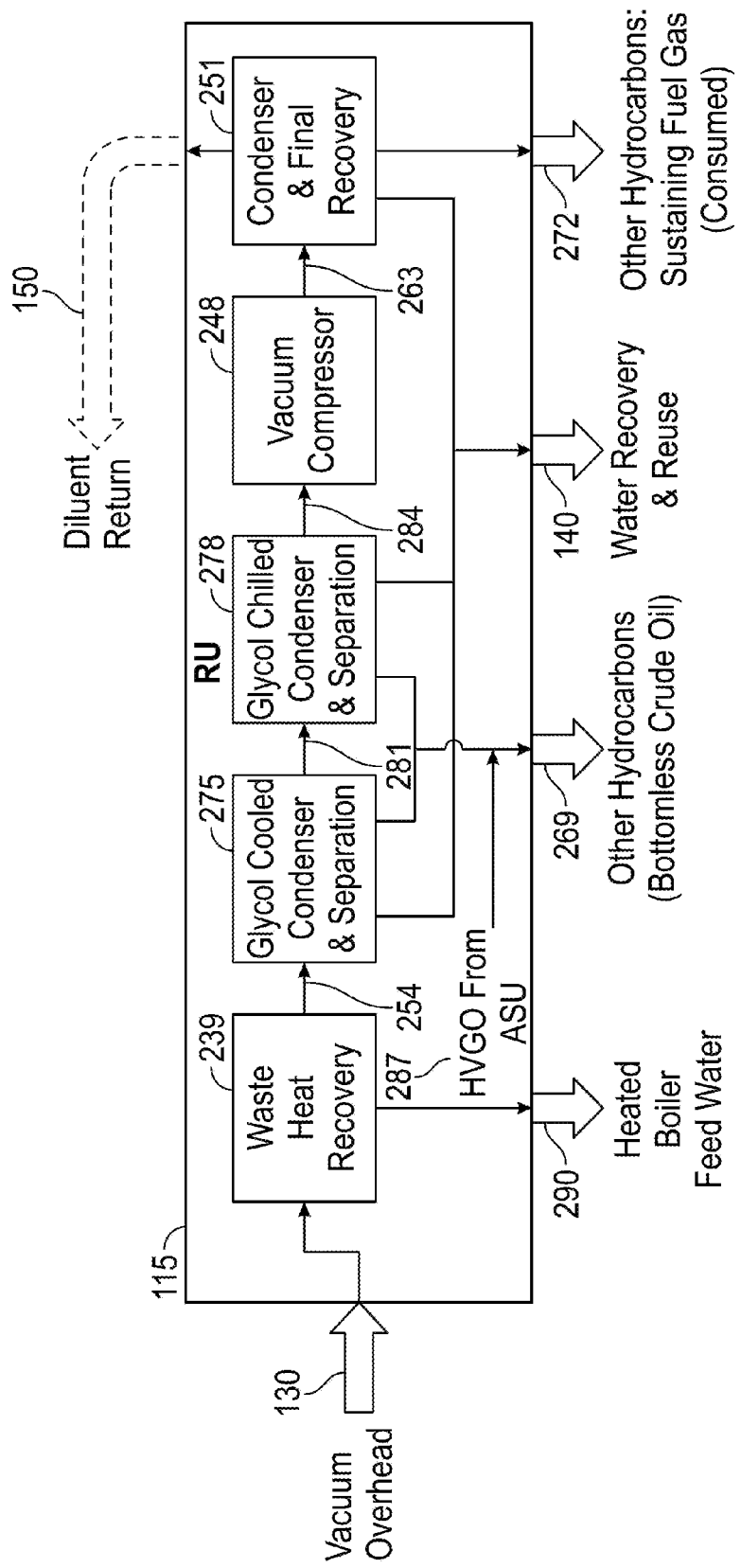

In FIG. 2E, the exemplary RU 115 comprises a glycol-cooled condenser and separation section 275 configured to receive the vacuum overhead vapor and condensed liquids stream 254 from the waste heat recovery section 239. In the depicted implementation, the RU 115 further comprises a glycol-chilled condenser and separation section 278 configured to receive the vacuum overhead glycol-cooled vapor stream 281 emitted by the glycol-cooled condenser and separation section 275. In the illustrated implementation, the glycol-chilled condenser and separation section 278 supplies the vacuum overhead glycol-chilled vapor stream 284 to the vacuum compressor 248. The illustrated glycol-cooled condenser and separation section 275 and the glycol-chilled condenser and separation section 278 together in combination emit the wide cut mixed by-product stream 269.

An exemplary implementation may comprise one or more valves configured to control the contribution of each of the glycol-cooled condenser and separation section 275 and the glycol-chilled condenser and separation section 278 to the wide cut mixed by-product stream 269. The wide cut mixed by-product stream 269 may comprise bottomless crude oil. In the depicted implementation, the wide cut mixed by-product stream 269 further comprises the HVGO stream from ASU 287. An exemplary implementation may comprise a valve configured to govern the contribution of the HVGO stream from ASU 287 to the wide cut mixed by-product stream 269. In the depicted implementation, the glycol-cooled condenser and separation section 275, the glycol-chilled condenser and separation section 278 and the condenser and final recovery section 251 together in combination emit recovered water via the water recovery and reuse stream outlet 140. An exemplary implementation may comprise one or more valves configured to govern the contribution of each of the glycol-cooled condenser and separation section 275, the glycol-chilled condenser and separation section 278 and the condenser and final recovery section 251 to the recovered water emitted via the water recovery and reuse stream outlet 140. In the depicted implementation, the waste heat recovery section 239 is configured to recover heat from the by-product vacuum overhead stream. The exemplary waste heat recovery section 239 emits the recovered heat as heated boiler feed water supplied via the heated boiler feed water (BFW) outlet 290.

Figure 2F:
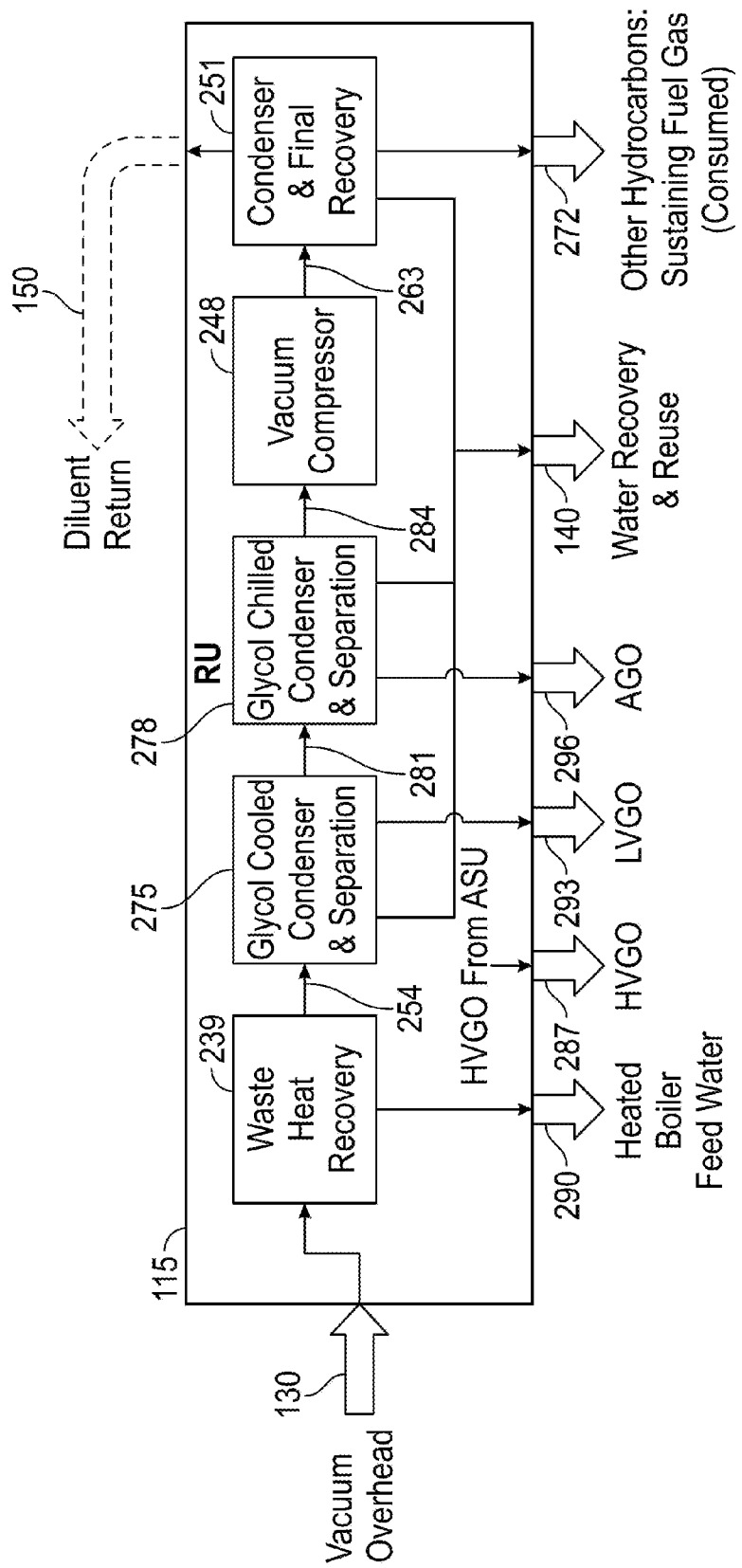

In FIG. 2F, the exemplary RU 115 comprises the glycol-cooled condenser and separation section 275 configured to emit a light vacuum gas oil stream via the light vacuum gas oil (LVGO) stream outlet 293. In the depicted implementation, the glycol-chilled condenser and separation section 278 is configured to emit an atmospheric distillable gas oil (AGO) stream via the atmospheric gas oil (AGO) stream outlet 296. The illustrated RU 115 implementation is configured to emit the HVGO stream from ASU 287. The depicted RU 115 implementation is exemplary of an RU designed to segregate a plurality of Gas Oil streams.

FIGS. 3A-3E depict block diagram views of exemplary hydrocarbon stream separation apparatus subsystem components.

Figure 3A:
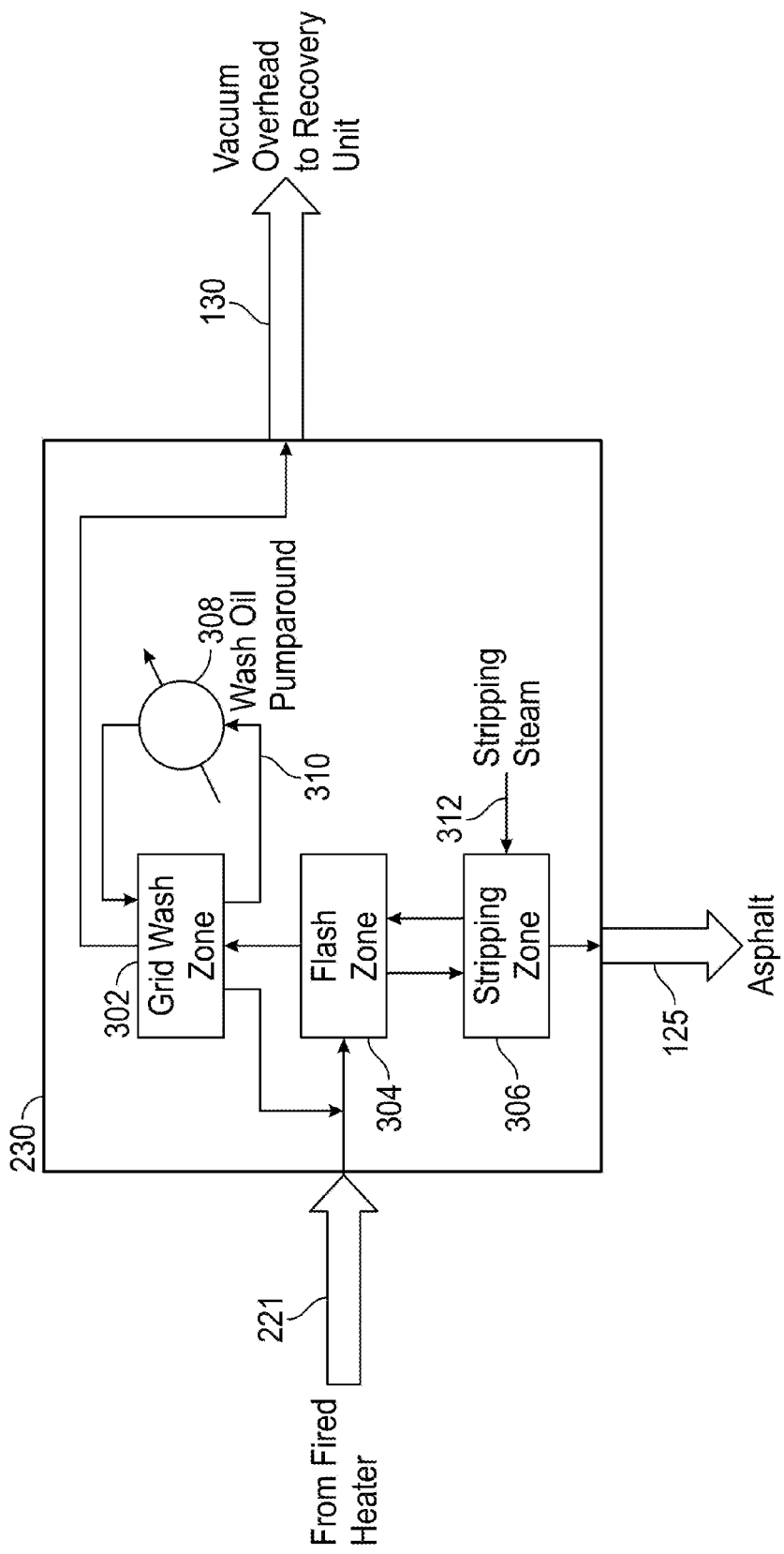
FIGS. 3A-3E depict block diagram views of exemplary hydrocarbon stream separation apparatus subsystem components.

In FIG. 3A, the exemplary vacuum separation column 230 comprises the grid wash zone 302, the flash zone 304, and the stripping zone 306. The illustrated flash zone 304 receives the heated feed 221. The heated feed 221 may comprise bitumen. The heated feed 221 may be received from a fired heater. In the depicted implementation, the wash oil pumparound cooler 308 is configured to supply wash oil to the grid wash zone 302. The wash oil pumparound cooler 308 may comprise a heat exchanger. The wash oil pumparound cooler 308 may comprise a pump. In the illustrated implementation, the wash oil pumparound cooler 308 is configured to supply cooled wash oil to the grid wash zone 302. In the depicted implementation, the wash oil supplied to the grid wash zone 302 is recirculated to the wash oil pumparound cooler 308 via the wash oil pumparound circuit 310. The illustrated implementation is configured to inject the stripping steam 312 into the stripping zone 306. In the illustrated example, the stripping steam 312 and the volatile vapors stripped in the stripping zone 306 are flashed in the flash zone 304. The flashed vapors and steam exit the flash zone 304 with the vapor phase into the grid wash zone 302. The depicted implementation is configured to supply the stripping steam 312 and volatile vapors stripped in the stripping zone 306 back into the flash zone 304 from the grid wash zone 302. In the depicted implementation, the exemplary vacuum separation column 230 supplies a by-product vacuum overhead stream from the grid wash zone 302 via the vacuum overhead outlet 130 to the recovery unit 115. In the illustrated implementation, an asphalt product stream flows from the stripping zone 306 via the product outlet 125.

Figure 3B:
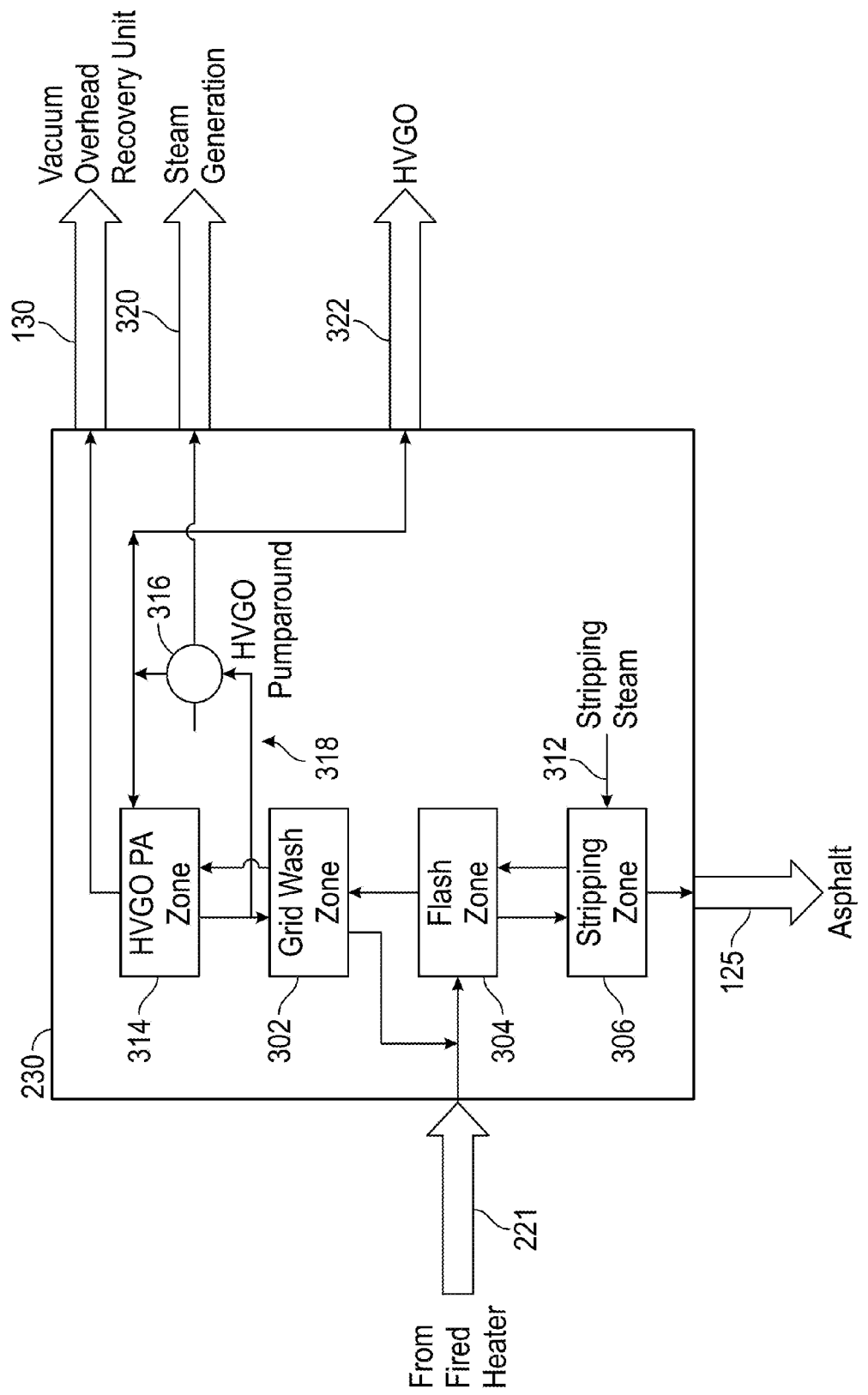

In FIG. 3B, the exemplary vacuum separation column 230 comprises the HVGO pumparound (PA) zone 314. In the depicted implementation, the HVGO pumparound cooler 316 is configured to supply HVGO to the HVGO PA zone 314. The HVGO pumparound cooler 316 may comprise a heat exchanger. The HVGO pumparound cooler 316 may comprise a pump. In the illustrated implementation, the HVGO pumparound cooler 316 is configured to supply cooled HVGO to the HVGO PA zone 314. The depicted implementation is configured to recirculate the HVGO supplied to the HVGO PA zone 314 to the HVGO pumparound cooler 316 via the HVGO pumparound circuit 318. The illustrated vacuum separation column 230 implementation is configured to recover steam from the HVGO pumparound circuit 318. In the depicted implementation, the steam recovered from the HVGO pumparound circuit is emitted via the HVGO pumparound steam generation 320 stream. In the illustrated example, the vacuum separation column 230 HVGO PA zone 314 implementation is configured to emit an HVGO stream via the HVGO stream from vacuum separation column 322.

Figure 3C:
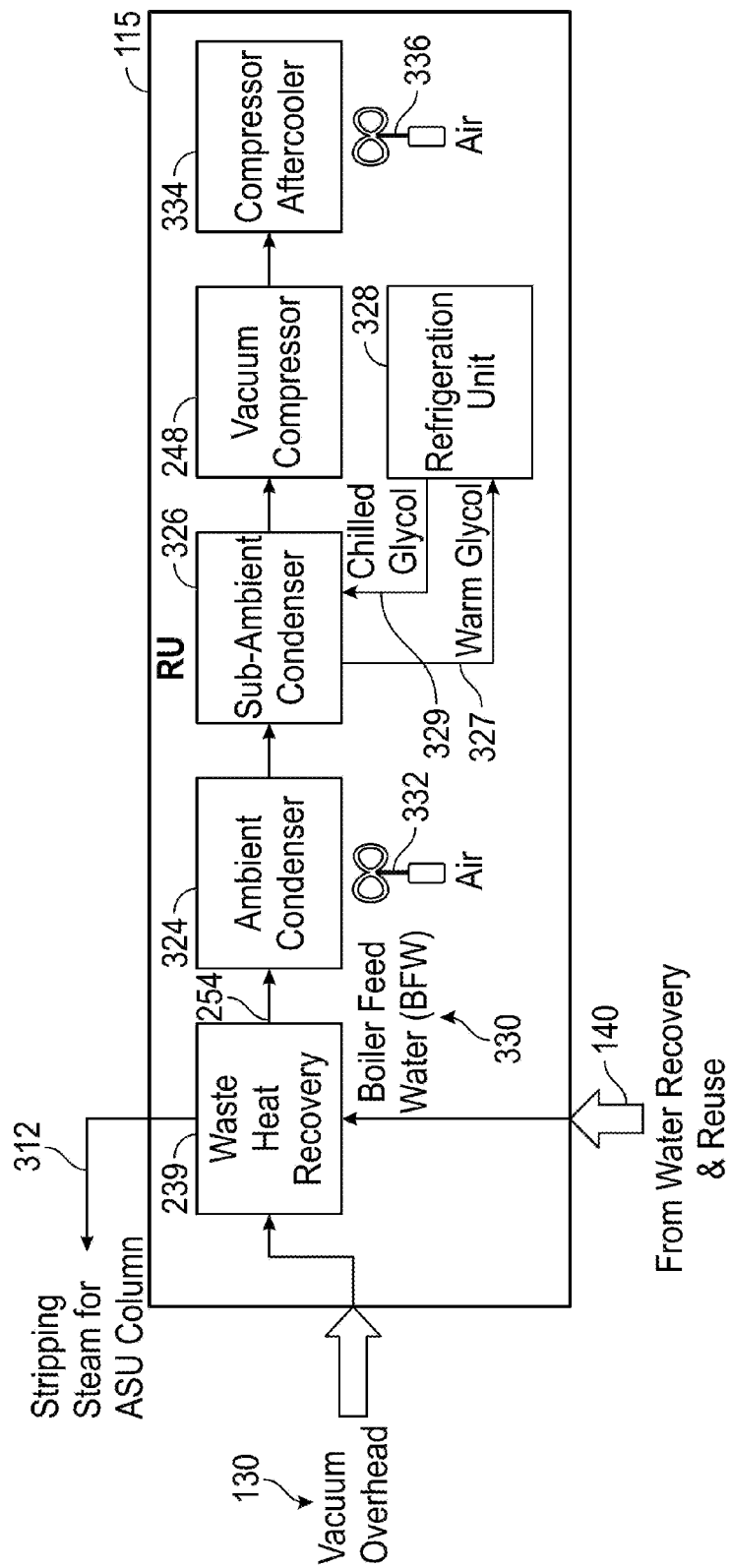

In FIG. 3C, the exemplary RU 115 implementation comprises the waste heat recovery 239 section configured to recover heat from a vacuum overhead stream and generate steam from a boiler feed water (BFW) stream received by the RU 115. The by-product vacuum overhead stream may be received from an ASU. In the illustrated example the BFW stream inlet 330 supplies the water recovery and reuse stream as BFW to the waste heat recovery 239 section. In the depicted example, the waste heat recovery 239 section heats the BFW and emits the heated BFW as stripping steam 312 for the ASU column. In the illustrated implementation, the ambient condenser 324 receives the vacuum overhead vapor and condensed liquids stream 254 emitted from the waste heat recovery section 239. In the illustrated example, the ambient condenser fan 332 is configured to permit varying the air volume through the ambient condenser 324. In the depicted implementation, the sub-ambient condenser 326 receives an ambient condensed vapor stream from the ambient condenser 324. In the illustrated example, the sub-ambient condenser 326 returns warm glycol 327 to the refrigeration unit 328 and receives chilled glycol 329 from the refrigeration unit 328. The depicted sub-ambient condenser 326 supplies a sub-ambient condensed vapor stream to the vacuum compressor 248. The depicted implementation is configured to feed the vacuum compressor 248 discharge to the compressor aftercooler 334. In the illustrated example, the compressor aftercooler fan 336 is configured to permit varying the air volume through the compressor aftercooler 334. The depicted implementation is an illustrative example of cooling media for condensing. The exemplary RU 115 may comprise the ambient condenser 324 coupled to the vacuum compressor 248. In some RU 115 implementations, the sub-ambient condenser 326 may be optional. In such an implementation without the sub-ambient condenser 326, the ambient condenser 324 may be operably coupled with the refrigeration unit 328.

Figure 3D:
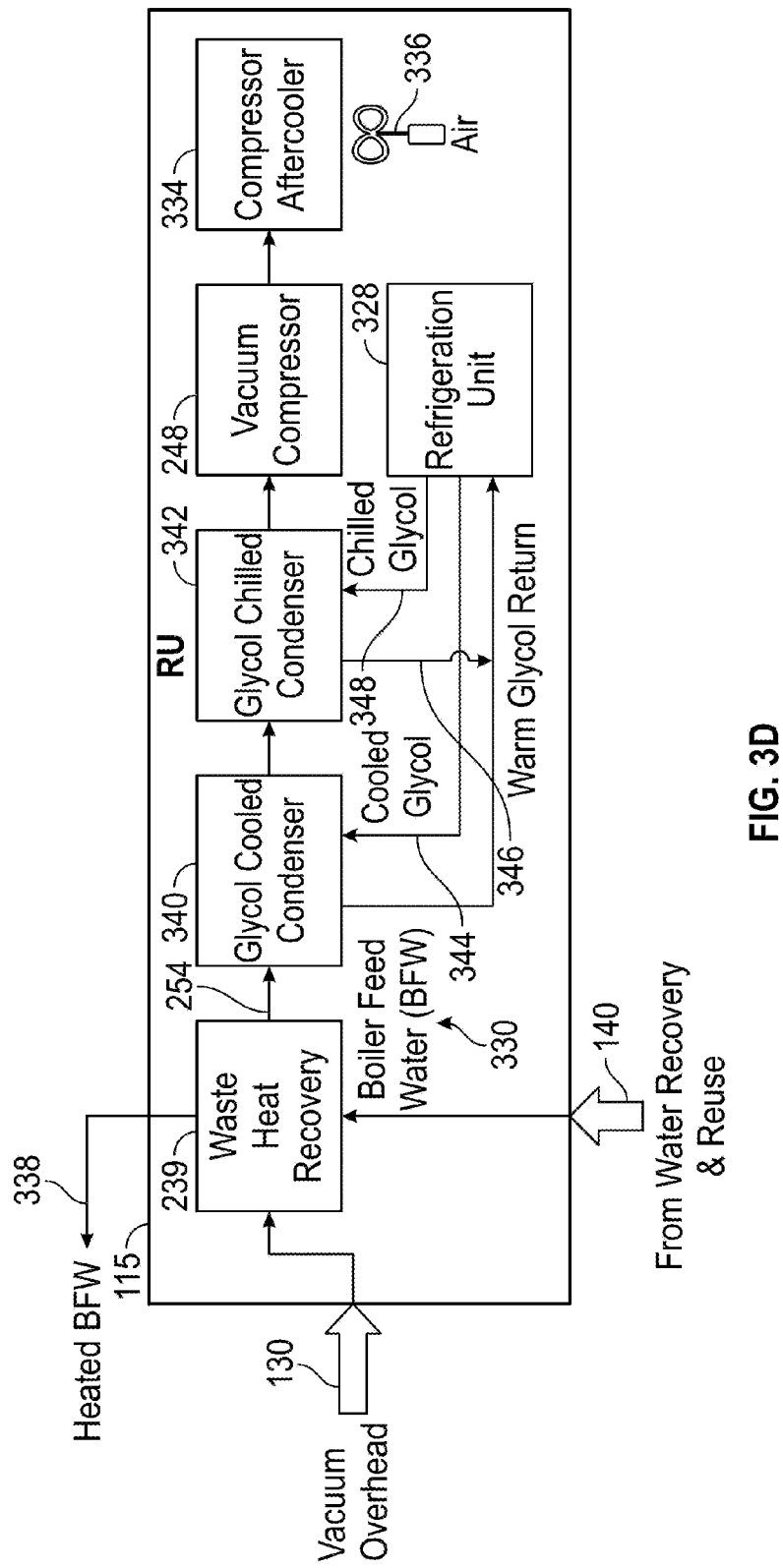

In FIG. 3D, the depicted RU 115 implementation comprises the waste heat recovery 239 section configured to recover heat from a vacuum overhead stream and heat a boiler feed water (BFW) stream received by the RU 115. The by-product vacuum overhead stream may be received from an ASU. In the illustrated example the BFW stream inlet 330 supplies the water recovery and reuse stream as BFW to the waste heat recovery section 239. In the depicted example, the waste heat recovery section 239 emits the heated BFW stream from RU 338. In the illustrated implementation, the glycol-cooled condenser 340 receives the vacuum overhead vapor and condensed liquids 254 stream emitted from the waste heat recovery 239 section. In the depicted implementation, the glycol-chilled condenser 342 receives a glycol-cooled condensed vapor stream from the glycol-cooled condenser 340. In the illustrated example, the glycol-cooled condenser 340 and the glycol-chilled condenser 342 together in combination return warm glycol to the refrigeration unit 328 via the warm glycol return 346. The depicted glycol-cooled condenser 340 receives cooled glycol 344 from the refrigeration unit 328. The illustrated glycol-chilled condenser 342 receives chilled glycol 348 from the refrigeration unit 328. The depicted glycol-chilled condenser 342 supplies a glycol-chilled condensed vapor stream to the vacuum compressor 248. The depicted implementation is an illustrative example of cooling media for condensing.

Figure 3E:
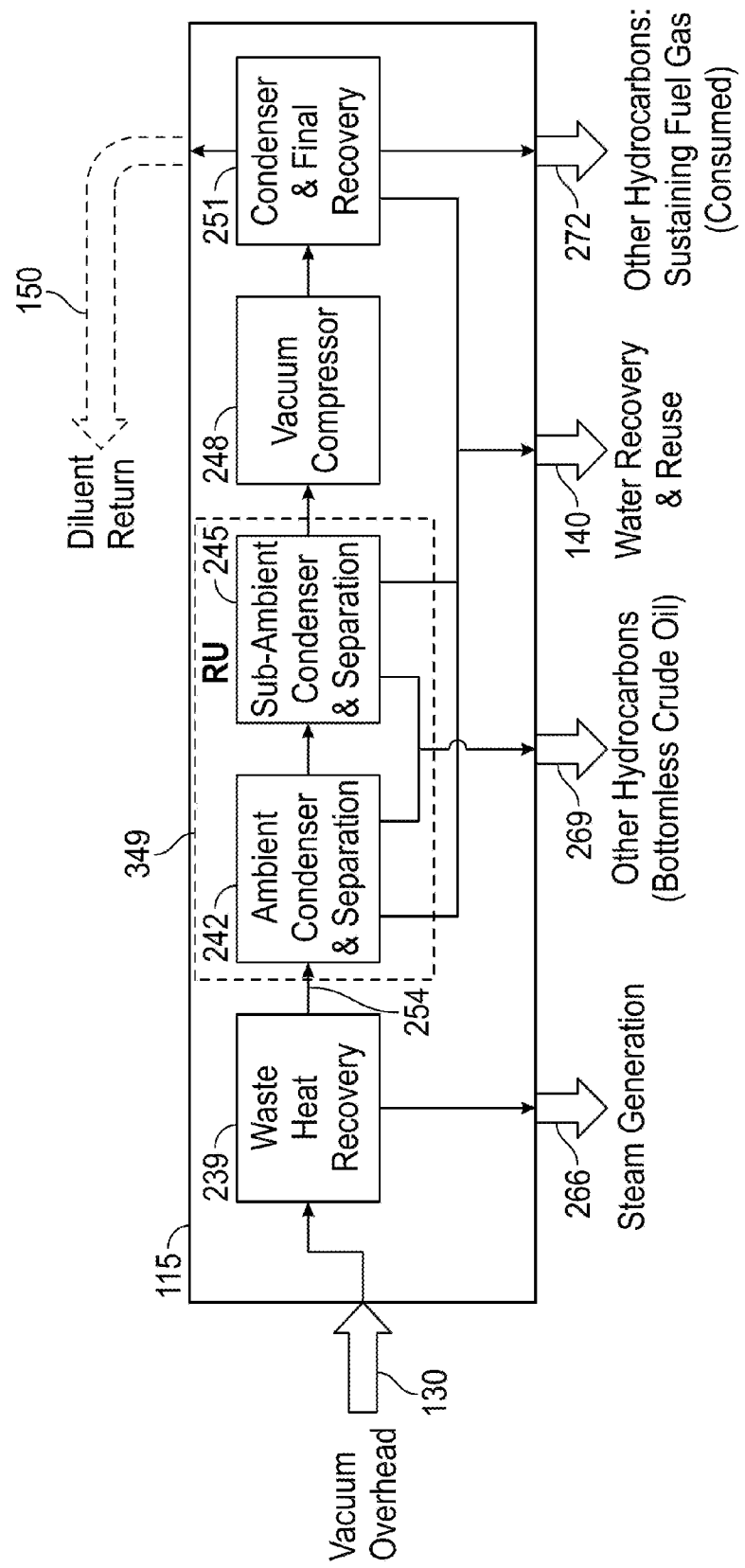
Figure 3E:
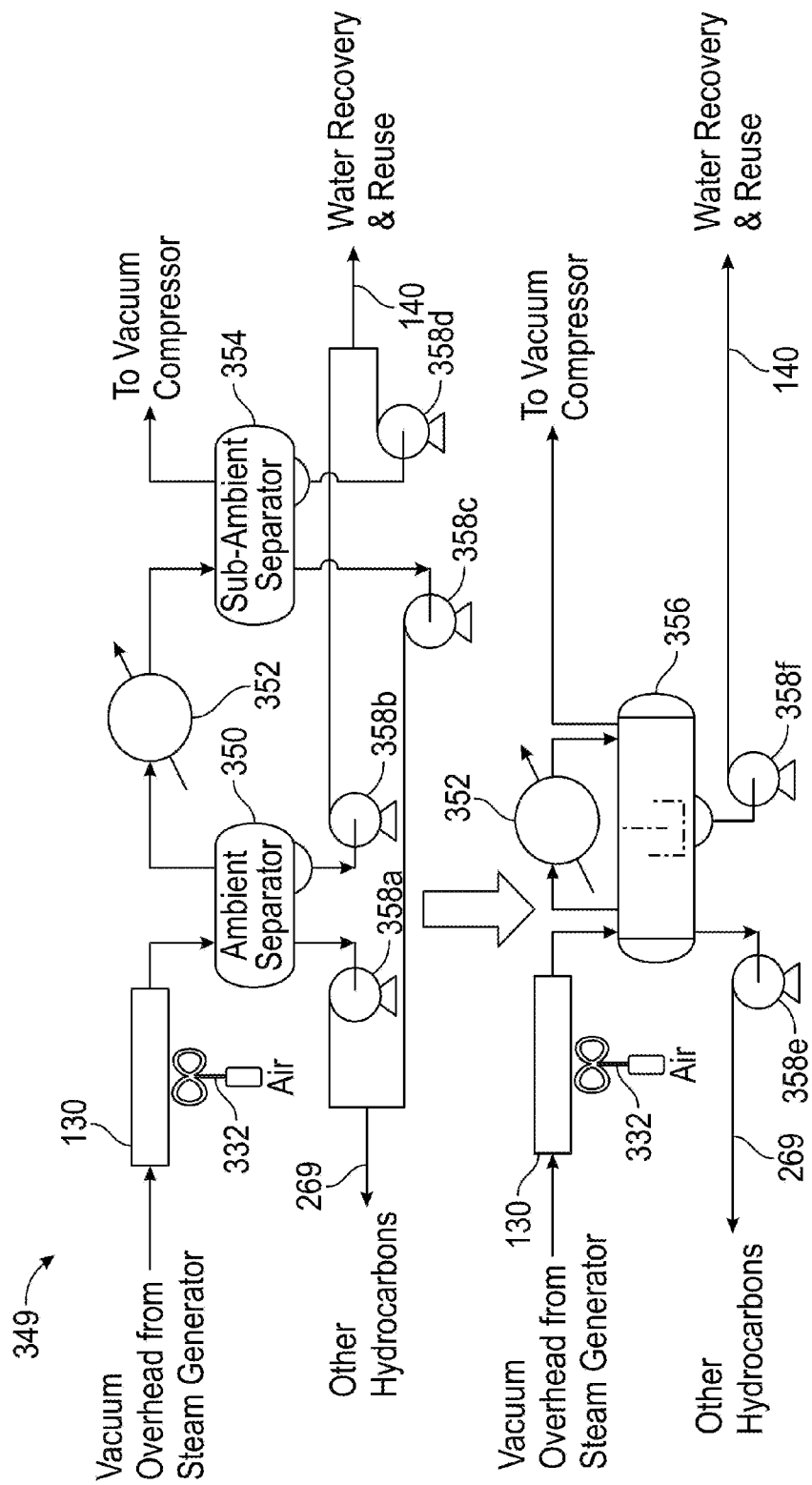

In FIG. 3E, the exemplary RU 115 implementation comprises features similar to the RU 115 design described with reference to FIG. 2D. The RU 115 implementation depicted by FIG. 3E further comprises the ambient condenser and separation section 242 and the sub-ambient condenser and separation section 245 integrated to form the integrated condenser and separation section 349. FIG. 3E contrasts exemplary discrete and integrated condenser and separation designs 349. The downward arrow in FIG. 3E illustrates an exemplary conversion from a base case of discrete condenser and separation design depicted in the upper portion of FIG. 3E to the integrated condenser and separation design illustrated in the lower portion of FIG. 3E. The arrow points down to implementation changes resulting in a condenser and separation design that eliminates one of the separation drums. The depicted discrete condenser and separation design 349 comprises the ambient separator 350, the sub-ambient condenser 352 and the sub-ambient separator 354. In the illustrated example, the discrete condenser and separation design 349 further comprises four pumps: the ambient separator hydrocarbon pump 358a, the ambient separator water pump 358b, the sub-ambient separator hydrocarbon pump 358c and the sub-ambient separator water pump 358d. In the discrete condenser and separation design 349 each of the ambient separator 350 and the sub-ambient separator 354 are configured with a boot adapted to facilitate water collection.

By contrast with the discrete condenser and separation design 349, the integrated condenser and separation design 349 illustrated by the lower portion of FIG. 3E comprises the combined ambient/sub-ambient separator 356 designed to integrate the functions of the ambient separator 350 and the sub-ambient separator 354 in a single unit configured with a single boot. In the depicted example, the combined ambient/sub-ambient separator 356 is configured with two pumps: the combined hydrocarbon pump 358e, and the combined water pump 358f. The exemplary integrated condenser and separation 349 design reduces component count, and may result in improved operating efficiency and reduced maintenance cost, as a result of integrating the ambient separator 350 and the sub-ambient separator 354 in a single unit.

FIG. 4 depicts a schematic view of an exemplary hydrocarbon stream separation apparatus implementation illustrating exemplary feed preparation, asphalt separation and recovery subsystems.

In FIG. 4, the exemplary hydrocarbon stream separation system 100 receives the oil feed source 401. The oil feed source 401 may comprise a hydrocarbon feed stream. The hydrocarbon feed stream may comprise feedstock. The feedstock may be feed oil. The feedstock may be, for example, bitumen, or residuum oil. Feedstock from the oil feed source 401 may be transferred from a point of storage to the hydrocarbon stream separation system 100. In the depicted implementation, the feedstock is first preheated in the heat exchanger 403 to a first temperature governed by the heat exchanger outlet temperature 404. The heat exchanger 403 preheats the feedstock to the first temperature by cooling the hot asphalt product stream flowing out of the process via the product outlet 125. An exemplary hydrocarbon stream separation system 100 may maintain the product rundown stream temperature 407 of the final product rundown stream 405 at some minimum temperature to maintain flowability of the residuum.

In an illustrative example, the product rundown stream temperature 407 may be controlled by adjusting the heat exchanger bypass valve 409 to permit some of the hot asphalt product to bypass the heat exchanger 403. The portion of the hot asphalt product bypassing the heat exchanger 403 may be governed by an automatic temperature controller. The preheated feed 206 then flows to the fired heater 218. In the depicted implementation, the fired heater 218 comprises the fired heater convective coil section 411 and the fired heater radiant coil section 413. In the illustrated implementation, the fired heater convective coil section 411 further preheats the preheated feed 206 to a second preheated temperature governed by the flash column inlet temperature 415. The second preheated temperature may be about 215° C. In an illustrative example, the flash column inlet temperature 415 may be controlled relative to a minimum temperature value sufficient to vaporize any diluents added to the feed to aid in flowability.

Most commercial diluents used today are comprised of $C_4$-$C_7$ hydrocarbons, commonly referred to as light naphtha or condensate. In an illustrative example, the diluent final boiling point may be between 80° C. and 100° C. The bulk bitumen initial boiling point may be about 200° C. This difference allows for effective removal of the diluent from the bitumen. For example, the part of the feed stream vaporized is the diluent component of the feed. For diluted bitumen, this may represent between 25% and 35% of the feed, or nominally 30%. The main specification at this step in the process is the final boiling point of the partially vaporized stream, which may be about 90° C. However, the partially vaporized stream at this point in the process may be mixed with diluted bitumen at about 215° C. When this two-phase flow stream enters the flash vessel 209 the diluent flashes to a vapor and rises up the column while the heavier hydrocarbons fall down the column. The partially vaporized heated feed 221 then flows to the flash vessel 209. The flash vessel 209 may be a near-ambient pressure flash column, wherein the flash column liquid phase 417 falls to the bottom and the flash column vapor phase 419 is allowed to rise up through the flash column. In an illustrative example, the flash vessel 209 needs only a few flash column fractionation equilibrium stages 420. For example, the flash vessel 209 may be configured with three to six flash column fractionation equilibrium stages 420, since added diluents have a wide boiling range difference with the heavier hydrocarbon liquids. The diluent vapor stream exits the top of the flash vessel 209 with the flash column vapor phase 419. The diluent vapor stream is condensed in atmospheric condenser 421.

The atmospheric condenser 421 may be either water or air-cooled, as the diluent vapors are liquid at ambient temperature and pressure. The condensed diluent liquids collect in the atmospheric reflux drum 423 and are transferred to the diluent storage tank 425. A minimal portion of the liquid diluent may be transferred back to the flash vessel 209 as diluent reflux 427. The portion of the liquid diluent transferred back to the flash vessel 209 as diluent reflux 427 may be controlled by the diluent reflux control valve 429. In an illustrative example, diluent reflux 427 transferred back to the flash vessel 209 may provide some wetting to trays or packing configured in the flash vessel 209. Wetting the trays or packing configured in the flash vessel 209 with diluent reflux 427 may wash down any non-volatile liquids that may have been entrained into the vapors rising above the heated feed 221 flash zone in the flash vessel 209. In one embodiment, the temperature difference between the heated feed 221 and the flash column liquid phase 417 may be controlled at a minimal temperature difference, based on adjusting the amount of diluent reflux 427 flowing back to the flash vessel 209.

In the illustrated implementation, the partially heated flash column liquid phase 417 is repressured and flows back to the fired heater radiant coil section 413. If the oil feed source 401 does not have an added diluent stream, the flash vessel 209 may be bypassed by the trim heat control bypass valve 431, to flow directly to the fired heater radiant coil section 413. The fired heater 218 further heats the feed oil to a final temperature and the feed oil exits the fired heater 218 as the feed oil two-phase stream 433. The final temperature is a control point of the disclosed process. The final temperature may be determined based on properties of the feedstock and the desired properties of the product. In an illustrative example, the final temperature may be between 650° F.-700° F.

In an illustrative example, a control loop configured to govern the burner control valve 435 may adjust the rate of burner supplemental fuel 437 flowing into the fired heater 218 burner system 439 until the temperature of the feed oil two-phase stream 433 reaches a desired set point. The desired set-point temperature may be predetermined based on laboratory analysis of the particular feed oil being processed and the desired grade of asphalt to be produced. The heated feed oil then flows into the vacuum separation column 230 flash zone 442 heated feed oil inlet 441 of the vacuum separation column 230 where the non-volatile liquids separate from the vapors and fall downward to the stripping section 443.

To avoid slumping volatile hydrocarbons into the non-volatile liquid phase, the vacuum separation column 230 flash zone 442 may be operated under vacuum pressures, typically in the range of 20-80 mmHg(a). However, the rapid pressure change from the fired heater radiant coil section 413 to the vacuum pressure of the vacuum separation column 230 flash zone 442 may cause some of the non-volatile liquids to be physically entrained as misty droplets into the rising vapor phase coming out of the flash zone 442. Depending on the level of vacuum applied to the vacuum separation column 230 flash zone 442, as much as 5 wt. % of the non-volatile liquid phase exiting the flash zone 442 may become physically entrained into the vapor phase. This physical entrainment, referred to as overflash, represents potential valuable product that might be lost if not recovered. Additionally, if the vapor phase is also condensed as a second valuable product, the contaminants contained within the non-volatile phase will also contaminate the condensed vapor phase. Typical bitumen and residuum contaminants include micro-carbon residue, sulfur, metals, and salts. These contaminants may significantly lessen the value of the condensed vapor phase to the extent they are allowed to remain and can be costly to remove.

In the depicted implementation, the non-volatile fraction exiting the vacuum separation column 230 flash zone 442 flows downward by gravity into the vacuum separation column 230 stripping section 443, where the non-volatile fraction is contacted by an upward flow of stripping steam 312. The stripping steam 312 flows upward to contact the non-volatile fraction in the vacuum separation column 230 stripping section 443. The stripping steam 312 flows upward at the stripping column steam inlet rate 447. In the depicted implementation, the stripping column steam inlet rate 447 is governed by the stripping column steam inlet control valve 449. In an illustrative example, the stripping steam 312 flow may be measured and controlled using an instrument configured to communicate signals with a valve, a sensor and a process control computer as well as display measurement and control on an operations display panel. The stripping steam 312 removes most of the remaining volatile hydrocarbons out of the non-volatile liquids.

To improve the physical contact between the liquid and vapor phases within the vacuum separation column 230 stripping section 443, stripping column internal structures 451 may be configured within the vacuum separation column 230 stripping section 443. The stripping column internal structures 451 may comprise, for example, internal trays or structured packing. The stripping column steam inlet rate 447 (that is, the rate of stripping steam 312 entering the vacuum separation column 230 stripping section 443) may be adjusted by the stripping column steam inlet control valve 449 to control a specification of the non-volatile liquid such as the Initial Boiling Point (IBP) or the Atmospheric Equivalent Temperature (AET). In an illustrative example, a rate of stripping steam 312 entering the vacuum separation column 230 stripping section 443 that may be effective to control a specification of the non-volatile liquid may be, for example, 40,000 to 50,000 std m³/d, or, in terms of a mass flow rate, an effective steam rate may be 3000 lb./hr or 1361 kg/hr.

In an illustrative example, because the amount of vacuum varies from facility to facility, the boiling point at process conditions in an exemplary hydrocarbon stream separation system 100 may be translated into a temperature at atmospheric pressure as if the material didn't coke. This is referred to as AET. Boiling point is a function of pressure and temperature. Reducing the pressure lowers the boiling point. The boiling point of the heavier components of heavy oil and bitumen is above the coking temperature. In an illustrative example, boiling heavy oil at atmospheric pressure may require temperatures that would turn the oil into petroleum coke. To avoid this problem the pressure may be reduced enough to get boiling points far enough below the coking threshold, to prevent coke from forming for the time duration the material is exposed to those temperatures. The stripping steam 312 and stripped volatile vapors flow back into the vacuum separation column 230 flash zone 442 via the flash zone heated feed oil inlet 441. The flashed stripping steam 312 and stripped volatile vapors exit the vacuum separation column 230 flash zone 442 with the vapor phase into the vacuum separation column 230 wash zone 444 section. In the depicted implementation, hot asphalt product flows out of the vacuum separation column 230 stripping section 443 to the feed heat exchanger 403. In the illustrated example, the hot asphalt product flows through the product outlet 125. In the depicted implementation, the asphalt product flows to a product storage tank.

In the illustrated implementation, overflash entrained liquids and volatile vapors 453 enter the vacuum separation column 230 wash zone 444. In the illustrated example, the vacuum separation column 230 wash zone 444 comprises wash zone internal structures 455 such as, for example, a grid, trays, or structured packing material configured to facilitate contact between vapor and liquid phases in the vacuum separation column 230 wash zone 444. In the depicted example, the cooled liquid phase (pumparound return) 457 is introduced to the top of the vacuum separation column 230 wash zone 444 bed. The cooled liquid phase (pumparound return) 457 is evenly distributed across the cross-section of the vacuum separation column 230 wash zone 444. The height of the vacuum separation column 230 wash zone 444 bed is minimized since the objective is not to cause fractionation, but to capture the entrained non-volatile liquids and their contaminants and scrub them from the wash zone section vapor phase 445. Typically, only 3-6 feet of vacuum separation column 230 wash zone 444 bed height, or 2-3 equilibrium stages are all that is needed to capture most or all of the non-volatile liquids.

The circulating cooled liquid phase (pumparound return) 457, the captured overflash non-volatiles, and some liquids condensed from the wash zone section vapor phase 445 collect in the bottom of the vacuum separation column 230 wash zone 444. The hot mixed liquids exit the bottom of the vacuum separation column 230 wash zone 444 and are recycled either back to the vacuum separation column 230 flash zone 442 via the overflash recycle to ASU feed 459 and the flash zone heated feed oil inlet 441, or to the wash oil pumparound cooler 461, based on the wash zone outlet control valve 463. The amount of wash oil circulated back to the top of the vacuum separation column 230 wash zone 444 bed may be set at the minimum rate necessary to wet the grid within the vacuum separation column 230 wash zone 444. Typical minimum wetting rates will vary between the different types of trays, grid, or packing used, but are usually around 2-3 gpm per sq. ft. of cross-sectional area of the vacuum separation column 230 wash zone 444. The liquid level in the bottom of the vacuum separation column 230 wash zone 444 may be maintained at a stable level by adjusting the flow back to the vacuum separation column 230 flash zone 442 via the overflash recycle to ASU feed 459. Excess liquid may be recycled back to the fired heater 218 via the velocity steam to heater inlet 465. Recycling excess liquid back to the fired heater may be desirable to gain an additional equilibrium stage over recycling back to the vacuum separation column 230 flash zone 442. In an illustrative example, wash oil pumparound provides cooling within the vacuum separation column 230. This cooling may condense vapor to liquid going down the vacuum separation column 230, to create more wash oil on a wash oil tray disposed just above the flash zone. Wash oil pumparound cooling may happen at least two ways: 1) increasing or decreasing flow in the pumparound circuit, maintaining the same temperature drop across the wash oil pumparound cooler 461 (increasing or decreasing flow in the pumparound circuit may be governed by a flow control valve configured in the pumparound circuit), or 2) maintaining the same flow in the wash oil pumparound circuit but increasing or decreasing temperature drop across the wash oil pumparound cooler 461. In an illustrative example, the wash zone outlet control valve 463 maintains the same flow in the wash oil pumparound circuit but increases or decreases temperature drop across the wash oil pumparound cooler 461 by putting more or less boiler feed water through the other side of the wash oil pumparound cooler 461, so the pumparound circuit sees a larger drop in temperature on the wash oil pumparound cooler 461 outlet. The wash zone outlet control valve 463 may be a temperature modulating valve.

In the depicted implementation, the wash zone section vapor phase 445 exits the vacuum separation column 230 wash zone section 444 as the by-product vacuum overhead stream via the vacuum overhead stream outlet 130 via the vacuum separation column 230 wash zone vapor phase outlet 467. The wash zone section vapor phase 445 exiting the vacuum separation column 230 wash zone 444 flows into the overhead steam generator 469. The overhead steam generator 469 partially condenses the vapor. The overhead steam generator 469 and the wash oil pumparound cooler 461 may be integrated parts of the same steam generator system configured to receive a boiler feed water stream via the steam generator boiler feed water inlet 471. In an illustrative example, the boiler feed water stream from the steam generator boiler feed water inlet 471 first flows through a coil in contact with the circulating wash oil and then to the overhead steam generator 469. The stripping steam 312 generated by the overhead steam generator 469 flows back to the vacuum separation column 230 stripping section 443 via the stripping column steam inlet 473.

Excess steam generated by the overhead steam generator 469 may flow back to the fired heater 218 as motive steam via the velocity steam to heater inlet 465. In most cases, extreme vacuums and high temperatures are not necessary to make sellable grades of asphalt and therefore motive steam is not typically needed to reduce coking potential in the charge furnace 218 tubes. Additionally, since the velocity steam to heater inlet 465 pressure at the fired heater 218 is higher than the pressure in the vacuum separation column 230 stripping section 443, the operating pressure of the overhead steam generator 469 may have to be increased to produce motive steam for injection into the fired heater 218 via the velocity steam to heater inlet 465. In one embodiment, the lower the pressure of the steam generator 469 allows more steam to be generated and less heat rejected by the ambient condenser 324. In the depicted implementation, the operating pressure of the overhead steam generator 469 may be governed based on injecting leak air 475 into the overhead steam generator 469. In an illustrative example, if the fired heater 218 inlet pressure was in a range of 800 to 1,000 KPa(g) at a temperature between 200 to 220° C., the steam generator 469 pressure would need to be higher than about 1,000 KPa(g) in order to inject steam into the furnace feed inlet and be controllable.

In the illustrated implementation, the partially condensed vapor exiting the overhead steam generator 469 flows to the ambient condenser 324. The ambient condenser 324 may be an air-cooled heat exchanger. The ambient condenser 324 condenses the remaining hydrocarbon vapors and the ambient separator 350 separates the ambient condensed liquid product 477 from the non-condensed phase. Because steam is generally non-condensable at ambient temperatures and at the minimum vacuum pressures required to make acceptable grades of asphalt, the vapor-phase leaving the ambient separator 350 is mostly steam and any air that has leaked into the system. In an illustrative example, the minimum effective vacuum may be about 100 mmHg. If the pressure gets much higher than 100 mmHg, the rising charge heater temperature starts to approach the zone of thermal decomposition. However, the compressive power requirements to re-pressurize the steam so that it is condensable at ambient temperatures can be very high.

The illustrated hydrocarbon stream separation system 100 may alternatively condense the steam prior to the residual vapor stream vacuum compressor 485. The residual vapor stream vacuum compressor 485 may be a vacuum pump. The steam may be condensed by the sub-ambient condenser and separation 245 section. The sub-ambient condenser and separation 245 section may comprise a sub-ambient temperature cooler. Sub-ambient temperatures, such as provided by a circulating stream of chilled glycol and water, may condense the steam while remaining under vacuum conditions. The condensed water is collected in the sub-ambient separator 354 and recycled back to the process after being treated for removal of any residual hydrocarbons that may be present. In the illustrated implementation, the condensed water is supplied to the water treatment system comprising a coalescing floatation system followed by activated carbon filtration. The treated water is transferred to the BFW storage tank 479 and any make-up water 481, such as from the reverse Osmosis (RO) unit 483, may be added to reconstitute the boiler feed water pumped back through the BFW inlet 330 to the wash oil pumparound cooler 461 and the overhead steam generator 469. Any recovered liquid hydrocarbons from the sub-ambient separator 354 may be mixed with the ambient separator 350 oil phase flowing from the ambient separator oil phase outlet 487 to the gas oil storage tank 489.

In the illustrated implementation, a residual vapor stream exits the sub-ambient separator 354 and flows to the residual vapor stream vacuum compressor 485. The residual vapor stream vacuum compressor 485 regulates the level of vacuum pressure applied to the vacuum separation column 230 flash zone 442 and the vacuum separation column 230 stripping section 443 subject to the pressure drops through the overhead steam generator 469, the ambient condenser 324, and the sub-ambient condenser and separation 245 section, including the interconnecting conduits. The minimum effective pressure that can be developed at the suction of the residual vapor stream vacuum compressor 485 depends on the pressure at which the steam will condense in the sub-ambient condenser and separation 245 section. Using a conventional circulating chilled glycol/water solution at 3° C. as the sub-cooled heat sink, and an approach temperature of 5° C., condensation pressures as low as 8 mmHg(a) at the sub-ambient condenser and separation 245 section may be sufficient. Using typical pressure drops, for the piping and coolers, the developed vacuum at the vacuum separation column 230 flash zone 442 may be in a range of 140-160 mmHg(a), which is adequate to produce asphalt with an IBP of at least 400° C. The level of vacuum developed at the vacuum separation column 230 flash zone 442 will naturally vary depending on the level of volatile components flowing through the system for a given bitumen feedstock.

In the depicted example, the discharge of the residual vapor stream vacuum compressor 485 flows through the second sub-ambient condenser and separation 245 section and into the vacuum compressor discharge separator 491. The vacuum compressor discharge separator 491 may be an atmospheric separator. The secondary recovered water stream 493 may be combined with the primary recovered water stream 495 before being transferred to the water treatment system 497. Any secondary recovered oil phase may be transferred to the diluent storage tank 425. Secondary recovered oil may be transferred alternately to the gas oil storage tank 489. Any remaining vapors exiting the vacuum compressor discharge separator 491 may be vented away. The residual non-condensable vapors 499 may be recycled back to the fired heater 218 as burner supplemental fuel 437 and incinerated in the fired heater 218 burner system 439 to supplement the fired heater 218 primary fuel supply.

Table 1 presents exemplary data illustrative of the effect of successive wash oil heat removal runs with reference to FIG. 4. In an illustrative example, an improved method of optimizing asphalt volume recovery might be to increase heat removal in the circulating wash zone liquid and recycling the additional condensed liquid back to the charge furnace inlet. Referring to Table 1, in Run #1, the 58° C. Wash Zone Temp. drop produced 335 BPSD of recycle wash oil. As additional heat was removed from the wash oil in the successive runs, the volume of excess recycled wash oil steadily increased from 335 BPSD to near 600 BPSD, while the required furnace duty only increased marginally. However, as the excess recycle wash oil rate increased, the recovered volume of on-spec asphalt also steadily increased. By Run #3, the gas oil 95% True Boiling Point (TBP) and the asphalt 5% TBP approached unity. As further heat was removed in Runs #4 through 14, the asphalt 5% TBP point moved to 10° C. above the gas oil 95% TBP point and eventually reached a pinch-point limit as to the quantity of heat that could be physically removed from the wash oil stream. Additionally, as the circulating wash oil going back to the vacuum separation column cooled further, potential viscosity limits were approached that could decrease effective distribution of liquid to the top of the wash zone grid.

TABLE 1

Effect of Successive Wash Oil Heat Removal Runs

| RUN | WASH OIL COOLER DUTY MMBTU/HR | FIRED HEATER DUTY MMBTU/HR | EXCESS WASH OIL RECYCLE BPSD | WASH ZONE TEMP. DROP ° C. | GAS OIL RECOV. % | GAS OIL TBP 95% ° C. | ASPHALT RECOV. % | ASPHALT TBP 5% ° C. |
|---|---|---|---|---|---|---|---|---|
| 1  | 1.37 | 12.34 | 335 | 58 | 29.2% | 449 | 70.8% | 444 |
| 2  | 1.50 | 12.36 | 369 | 62 | 28.8% | 445 | 71.2% | 443 |
| 3  | 1.62 | 12.39 | 401 | 65 | 28.6% | 442 | 71.4% | 443 |
| 4  | 1.71 | 12.39 | 428 | 68 | 28.2% | 438 | 71.8% | 442 |
| 5  | 1.80 | 12.44 | 456 | 70 | 27.9% | 438 | 72.1% | 442 |
| 6  | 1.87 | 12.45 | 476 | 72 | 27.6% | 435 | 72.4% | 441 |
| 7  | 1.95 | 12.5  | 498 | 73 | 27.5% | 435 | 72.5% | 441 |
| 8  | 2.00 | 12.51 | 516 | 75 | 27.6% | 433 | 72.4% | 440 |
| 9  | 2.06 | 12.53 | 536 | 76 | 27.4% | 431 | 72.6% | 439 |
| 10 | 2.10 | 12.54 | 550 | 77 | 27.2% | 430 | 72.8% | 439 |
| 11 | 2.15 | 12.6  | 565 | 78 | 27.3% | 430 | 72.7% | 439 |
| 12 | 2.18 | 12.6  | 575 | 79 | 27.2% | 429 | 72.8% | 439 |
| 13 | 2.21 | 12.61 | 584 | 80 | 27.1% | 428 | 72.9% | 438 |
| 14 | 2.23 | 12.61 | 593 | 80 | 27.0% | 428 | 73.0% | 438 |

Table 2 presents exemplary simulation data illustrative of an exemplary hydrocarbon stream separation process implementation with reference to FIG. 4. In Table 2, each number above a column heading refers to the respective numbered box in FIG. 4. For example, the number '11' above the Table 2 column heading "Wash Oil" refers to the box numbered "11" near element 445 depicted in FIG. 4. In FIG. 4, the exemplary hydrocarbon stream separation system 100 control parameters are designated by circles labeled "TC," "AC," "LC," or "PC." In FIG. 4, TC indicates Temperature Control; AC indicates Analyzer Control; LC indicates Composition Level Control; and PC indicates Pressure Control. The following information concerning the column heading abbreviations in Table 2 is provided to aid the reader: 'ATHABASCA' relates to an oil field; 'COLD LAKE' relates to an oil field; 'DILUENT' and 'DILBIT' are as described herein; 'PFLSH BTMS' relates to 'preflash bottoms;' 'VP DISCH VAP' refers to 'vacuum pump discharge vapor;' 'VP SUCT VAP' refers to 'vacuum pump suction vapor;' 'HOT PFLSH FEED' refers to 'hot preflash feed;' 'DILUENT TO TK' refers to 'diluent to tankage;' 'ASPHALT TO TANKAGE' refers to 'asphalt to tankage;' 'WO TO RECY' refers to 'wash oil to recycle;' 'COOL WO TO GRID' refers to 'cool wash oil to wash grid'; 'COND3 OUT' refers to 'condenser 3 out;' 'COND2 OUT' refers to 'condenser 2 out;' 'COND1 OUT' refers to 'condenser 1 out;' 'MOTIVE STEAMX' refers to motive steam; 'FRVGO TO TK; refers to 'full range VGO to tankage;' 'STG1V refers to 'stage 1 vapor;' 'FZV' refers to 'flash zone vapor;' 'VAC HTR OUT' refers to 'vacuum heater out;' 'VRES STRP STMX' refers to 'vacuum resid stripping steam;' 'AMB FRVGO' refers to 'ambient FRVGO;' 'CHILL FRVGO' refers to 'chilled FRVGO;' 'SOUR WATER TO TREAT' refers to 'sour water to treatment;' 'CCWS-2' refers to 'chilled cooling supply;' 'CCWR-2' refers to 'cooling return;' 'VP SUCT.' refers to 'vacuum pump suction;' and 'AIR LEAKS' refers to 'air leakage into process.'

TABLE 2

| Process Control and Operating Parameters | | | | |
|---|---|---|---|---|
| | Unit | ATHABASCA | COLD LAKE | DILUENT |
| Vapor Fraction | | | | |
| Temperature | C | 15.6 | 15.6 | 15.6 |
| Pressure | mmHg(0C) | 1,292.9 | 1,292.9 | 1,292.9 |
| Mass Flow | lb/hr | 59,160 | 0.0 | 11,360 |
| Liquid Volume Flow | GPM | 117 | 0 | 35 |
| Petroleum Property (TBP 0%[Petrol]) | C | 256 | 114 | −5 |
| Petroleum Property (TBP 10%[Petrol]) | C | 337 | 139 | 21 |
| Petroleum Property (TBP 90%[Petrol]) | C | 848 | 418 | 99 |
| Petroleum Property (TBP 100%[Petrol]) | C | 1,000 | 580 | 199 |
| Phase Kinematic Viscosity (Liquid Phase) | cSt | 804,194 | 11,876 | 0 |

| | Unit | ATHABASCA | DILBIT | PFLSH BTMS |
|---|---|---|---|---|
| Mass Flow | lb/hr | 59,160 | 70,520 | 61,976 |
| Std Ideal Liq Vol Flow | barrel/day | 4,000 | 5,200 | 4,290 |
| Sulfur Content (Wt %) | | 0 | 0 | 0 |
| Petroleum Property (Nitrogen Content[Petrol]) | ppmwt | 4,431 | 3,717 | 4,230 |
| Calculator (Iron Content[Petrol]-Overall) | ppmwt | 8.0 | 6.7 | 7.6 |
| Calculator (Nickel Content[Petrol]-Overall) | ppmwt | 85.4 | 71.6 | 81.5 |
| Calculator (Vanadium Content[Petrol]-Overall) | ppmwt | 222.2 | 186.4 | 212.1 |

| | Unit | SLOP DILUENT | VP DISCH VAP | VP SUCT VAP |
|---|---|---|---|---|
| Temperature | C | 39.9 | 117.7 | 8.4 |
| Pressure | mmHg(0C) | 791.2 | 817.1 | 28.0 |

| | Unit | 1 DILBIT | 2 HOT PFLSH FEED | 3 DILUENT TO TK |
|---|---|---|---|---|
| Vapor Fraction | | | | |
| Temperature | C | 9.1 | 166.9 | 40.2 |
| Pressure | mmHg(OC) | 1,292.9 | 5,947.2 | 3,406.5 |
| Mass Flow | lb/hr | 70,520 | 70,520 | 9,601 |
| Liquid Volume Flow | GPM | 152 | 152 | 30 |
| Petroleum Property (TBP 0%[Petrol]) | C | 1 | 1 | −8 |
| Petroleum Property (TBP 10%[Petrol]) | C | 31 | 31 | 11 |
| Petroleum Property (TBP 90%[Petrol]) | C | 838 | 838 | 87 |
| Petroleum Property (TBP 100%[Petrol]) | C | 1,000 | 1,000 | 277 |
| Phase Kinematic Viscosity (Liquid Phase) | cSt | 291 | 1.2 | 0.4 |

| | Unit | ASPHALT TO TK | WO TO RECY | COOL WO TO GRID |
|---|---|---|---|---|
| Mass Flow | lb/hr | 44,355 | 4,913 | 14,717 |
| Std Ideal Liq Vol Flow | barrel/day | 2,913 | 334 | 1,000 |
| Sulfur Content (Wt %) | | 0 | 0 | 0 |
| Petroleum Property (Nitrogen Content[Petrol]) | ppmwt | 4,838 | 2,321 | 2,321 |
| Calculator (Iron Content[Petrol]-Overall) | ppmwt | 10.7 | 5.1 | 5.1 |
| Calculator (Nickel Content[Petrol]-Overall) | ppmwt | 113.8 | 54.1 | 54.1 |
| Calculator (Vanadium Content[Petrol]-Overall) | ppmwt | 296.1 | 140.8 | 140.8 |

| | Unit | COND3 OUT | COND2 OUT | COND1 OUT |
|---|---|---|---|---|
| Temperature | C | 8.4 | 43.3 | 190.3 |
| Pressure | mmHg(0C) | 28.0 | 53.9 | 79.7 |

| | Unit | 4 PFLSH BTMS | 5 MOTIVE STEAMX | 6 WO TO RECY |
|---|---|---|---|---|
| Vapor Fraction | | | | |
| Temperature | C | 156.3 | 200.8 | 283.4 |
| Pressure | mmHg(0C) | 983.1 | 2,828.6 | 2,699.5 |
| Mass Flow | lb/hr | 60,928 | 0 | 9,810 |
| Liquid Volume Flow | GPM | 122 | 0 | 20 |

TABLE 2-continued

| Process Control and Operating Parameters | | | |
|---|---|---|---|
| Petroleum Property (TBP 0%[Petrol]) | C | 31 | 325 |
| Petroleum Property (TBP 10%[Petrol]) | C | 308 | 383 |
| Petroleum Property (TBP 90%[Petrol]) | C | 846 | 704 |
| Petroleum Property (TBP 100%[Petrol]) | C | 1,000 | 992 |
| Phase Kinematic Viscosity (Liquid Phase) | cSt | 10.8 | 1.1 |

| | Unit | FRVGO TO TK |
|---|---|---|
| Mass Flow | lb/hr | 17,556 |
| Std Ideal Liq Vol Flow | barrel/day | 1,370 |
| Sulfur Content (Wt %) | | 0 |
| Petroleum Property (Nitrogen Content[Petrol]) | ppmwt | 23.9 |
| Calculator (Iron Content[Petrol]-Overall) | ppmwt | 0.0 |
| Calculator (Nickel Content[Petrol]-Overall) | ppmwt | 0.0 |
| Calculator (Vanadium Content[Petrol]-Overall) | ppmwt | 0.0 |

| | Unit | STG1V | FZV | ASPHALT-1 |
|---|---|---|---|---|
| Temperature | C | 264.8 | 313.3 | 305.9 |
| Pressure | mmHg(0C) | 105.6 | 155.1 | 160.3 |

| | Unit | 7 VAC HTR OUT | 8 VRES STRP STMX | 9 ASPHALT-1 |
|---|---|---|---|---|
| Vapor Fraction | | 8.1% | | |
| Temperature | C | 337.0 | 193.8 | 299.2 |
| Pressure | mmHg(0C) | 2,828.6 | 160.3 | 160.3 |
| Mass Flow | lb/hr | 60,928 | 3,000 | 46,800 |
| Liquid Volume Flow | GPM | 122 | 6 | 90 |
| Petroleum Property (TBP 0%[Petrol]) | C | 31 | | 400 |
| Petroleum Property (TBP 10%[Petrol]) | C | 308 | | 454 |
| Petroleum Property (TBP 90%[Petrol]) | C | 846 | | 870 |
| Petroleum Property (TBP 100%[Petrol]) | C | 1,000 | | 1,000 |
| Phase Kinematic Viscosity (Liquid Phase) | cSt | 0.7 | | 9.0 |

| | Unit | |
|---|---|---|
| Mass Flow | lb/hr | |
| Std Ideal Liq Vol Flow | barrel/day | |
| Sulfur Content (Wt %) | | |
| Petroleum Property (Nitrogen Content[Petrol]) | ppmwt | |
| Calculator (Iron Content[Petrol]-Overall) | ppmwt | |
| Calculator (Nickel Content[Petrol]-Overall) | ppmwt | |
| Calculator (Vanadium Content[Petrol]-Overall) | ppmwt | |
| Temperature | C | |
| Pressure | mmHg(0C) | |

| | Unit | 10 STG1V | 11 WASH OIL | 12 COOL WO TO GRID |
|---|---|---|---|---|
| Vapor Fraction | | | | |
| Temperature | C | 247.1 | 283.2 | 134.9 |
| Pressure | mmHg(0C) | 105.6 | 113.8 | 2,337.5 |
| Mass Flow | lb/hr | 17,130 | 24,202 | 14,392 |
| Liquid Volume Flow | GPM | 38 | 49 | 29 |
| Petroleum Property (TBP 0%[Petrol]) | C | 8 | 325 | 325 |
| Petroleum Property (TBP 10%[Petrol]) | C | 68 | 383 | 383 |
| Petroleum Property (TBP 90%[Petrol]) | C | 397 | 704 | 704 |
| Petroleum Property (TBP 100%[Petrol]) | C | 675 | 992 | 992 |
| Phase Kinematic Viscosity (Liquid Phase) | cSt | | 1.1 | 8.3 |

| | Unit | |
|---|---|---|
| Mass Flow | lb/hr | |
| Std Ideal Liq Vol Flow | barrel/day | |
| Sulfur Content (Wt %) | | |
| Petroleum Property (Nitrogen Content[Petrol]) | ppmwt | |
| Calculator (Iron Content[Petrol]-Overall) | ppmwt | |

TABLE 2-continued

Process Control and Operating Parameters

| | Unit |
|---|---|
| Calculator (Nickel Content[Petrol]-Overall) | ppmwt |
| Calculator (Vanadium Content[Petrol]-Overall) | ppmwt |
| Temperature | C |
| Pressure | mmHg(0C) |

| | Unit | 13<br>COND1<br>OUT | 13A<br>COND2<br>OUT | 14<br>COND3<br>OUT |
|---|---|---|---|---|
| Vapor Fraction | | 92% | | 18% |
| Temperature | C | 195.9 | 43.3 | 2.7 |
| Pressure | mmHg(0C) | 79.7 | 53.9 | 28.0 |
| Mass Flow | lb/hr | 17,380 | 4,911 | 4,911 |
| Liquid Volume Flow | GPM | 39 | 12 | 12 |
| Petroleum Property (TBP 0%[Petrol]) | C | | | |
| Petroleum Property (TBP 10%[Petrol]) | C | | | |
| Petroleum Property (TBP 90%[Petrol]) | C | | | |
| Petroleum Property (TBP 100%[Petrol]) | C | | | |
| Phase Kinematic Viscosity (Liquid Phase) | cSt | | | |

| | Unit |
|---|---|
| Mass Flow | lb/hr |
| Std Ideal Liq Vol Flow | barrel/day |
| Sulfur Content (Wt %) | |
| Petroleum Property (Nitrogen Content[Petrol]) | ppmwt |
| Calculator (Iron Content[Petrol]-Overall) | ppmwt |
| Calculator (Nickel Content[Petrol]-Overall) | ppmwt |
| Calculator (Vanadium Content[Petrol]-Overall) | ppmwt |
| Temperature | C |
| Pressure | mmHg(0C) |

| | Unit | 15<br>AMB<br>FRVGO | 24<br>CHILL<br>FRVGO | 16<br>SOUR<br>WAT TO<br>TREAT |
|---|---|---|---|---|
| Vapor Fraction | | | | |
| Temperature | C | 43.3 | 2.7 | 3.9 |
| Pressure | mmHg(0C) | 53.9 | 28.0 | 2,613.7 |
| Mass Flow | lb/hr | 12,470 | 43 | 2,978 |
| Liquid Volume Flow | GPM | 27 | 0 | 6 |
| Petroleum Property (TBP 0%[Petrol]) | C | 123 | 33 | |
| Petroleum Property (TBP 10%[Petrol]) | C | 265 | 89 | |
| Petroleum Property (TBP 90%[Petrol]) | C | 400 | 291 | |
| Petroleum Property (TBP 100%[Petrol]) | C | 679 | 424 | |
| Phase Kinematic Viscosity (Liquid Phase) | cSt | 9.0 | 3.0 | |

| | Unit |
|---|---|
| Mass Flow | lb/hr |
| Std Ideal Liq Vol Flow | barrel/day |
| Sulfur Content (Wt %) | |
| Petroleum Property (Nitrogen Content[Petrol]) | ppmwt |
| Calculator (Iron Content[Petrol]-Overall) | ppmwt |
| Calculator (Nickel Content[Petrol]-Overall) | ppmwt |
| Calculator (Vanadium Content[Petrol]-Overall) | ppmwt |
| Temperature | C |
| Pressure | mmHg(0C) |

| | Unit | 17<br>CCWS-2 | 18<br>CCWR-2 | 19<br>VP SUCT. |
|---|---|---|---|---|
| Vapor Fraction | | | | |
| Temperature | C | 1.0 | 11.5 | 2.7 |
| Pressure | mmHg(0C) | 3,361.5 | 2,844.3 | 28.0 |
| Mass Flow | lb/hr | 174,901 | 174,901 | 1,994 |
| Liquid Volume Flow | GPM | 350 | 350 | 6 |
| Petroleum Property (TBP 0%[Petrol]) | C | | | |
| Petroleum Property (TBP 10%[Petrol]) | C | | | |
| Petroleum Property (TBP 90%[Petrol]) | C | | | |

TABLE 2-continued

Process Control and Operating Parameters

| | Unit |
|---|---|
| Petroleum Property (TBP 100%[Petrol]) | C |
| Phase Kinematic Viscosity (Liquid Phase) | cSt |

| | Unit |
|---|---|
| Mass Flow | lb/hr |
| Std Ideal Liq Vol Flow | barrel/day |
| Sulfur Content (Wt %) | |
| Petroleum Property (Nitrogen Content[Petrol]) | ppmwt |
| Calculator (Iron Content[Petrol]-Overall) | ppmwt |
| Calculator (Nickel Content[Petrol]-Overall) | ppmwt |
| Calculator (Vanadium Content[Petrol]-Overall) | ppmwt |
| Temperature | C |
| Pressure | mmHg(0C) |

| | Unit | 21 AIR LEAKS | 22 SLOP DILUENT | 23 STACK FLUE |
|---|---|---|---|---|
| Vapor Fraction | | | | |
| Temperature | C | 20.0 | 36.9 | 160.3 |
| Pressure | mmHg(0C) | 105.6 | 791.2 | 767.4 |
| Mass Flow | lb/hr | 250 | 1,002 | 13,264 |
| Liquid Volume Flow | GPM | 1 | 3 | 32 |
| Petroleum Property (TBP 0%[Petrol]) | C | | 7 | |
| Petroleum Property (TBP 10%[Petrol]) | C | | 28 | |
| Petroleum Property (TBP 90%[Petrol]) | C | | 121 | |
| Petroleum Property (TBP 100%[Petrol]) | C | | 298 | |
| Phase Kinematic Viscosity (Liquid Phase) | cSt | | 0.5 | |

| | Unit |
|---|---|
| Mass Flow | lb/hr |
| Std Ideal Liq Vol Flow | barrel/day |
| Sulfur Content (Wt %) | |
| Petroleum Property (Nitrogen Content[Petrol]) | ppmwt |
| Calculator (Iron Content[Petrol]-Overall) | ppmwt |
| Calculator (Nickel Content[Petrol]-Overall) | ppmwt |
| Calculator (Vanadium Content[Petrol]-Overall) | ppmwt |
| Temperature | C |
| Pressure | mmHg(0C) |

FIG. 5 depicts a schematic view of an exemplary hydrocarbon stream separation apparatus implementation illustrating exemplary feed preparation and asphalt separation subsystems. In FIG. 5, the exemplary hydrocarbon stream separation system 100 comprises exemplary asphalt separation and feed preparation components described with reference to FIGS. 1-4. The illustrated hydrocarbon stream separation system 100 is configured to produce asphalt from the oil feed source 401. Asphalt product may be delivered via the product outlet 125. The illustrated hydrocarbon stream separation system 100 may be operably coupled with a recovery system configured to recover water, heat, or other resources separated from the oil feed source 401 by the hydrocarbon stream separation system 100.

FIG. 6 is a graph view depicting an illustrative example of the effect of refrigeration on steam in an exemplary thermodynamic system. In FIG. 6, the exemplary graph of steam vapor pressure in an exemplary thermodynamic system as a function of temperature 600 illustrates saturated steam vapor pressure 605 plotted as a function of saturated temperature. The depicted saturated steam vapor pressure graph is partitioned into the exclusively steam region 610 and the condensed water and steam region 615. In the illustrated example, above the graphed vapor pressure, the system comprises condensed water and steam. Below the graphed vapor pressure, the system consists of exclusively steam. The arrow directed to the left of the graph illustrates exemplary relationships between the effects on steam by a sub-ambient separator, refrigeration, and an ambient separator. In an illustrative example, refrigeration may remove a significant amount of water vapor from an exemplary vacuum pump circuit. Furthermore, refrigeration may remove water from an exemplary system more efficiently than conventional technologies. Such improved water removal capacity and efficiency may result in reducing the energy or cost associated with vacuum pump requirements for an exemplary system design.

Figure 7:
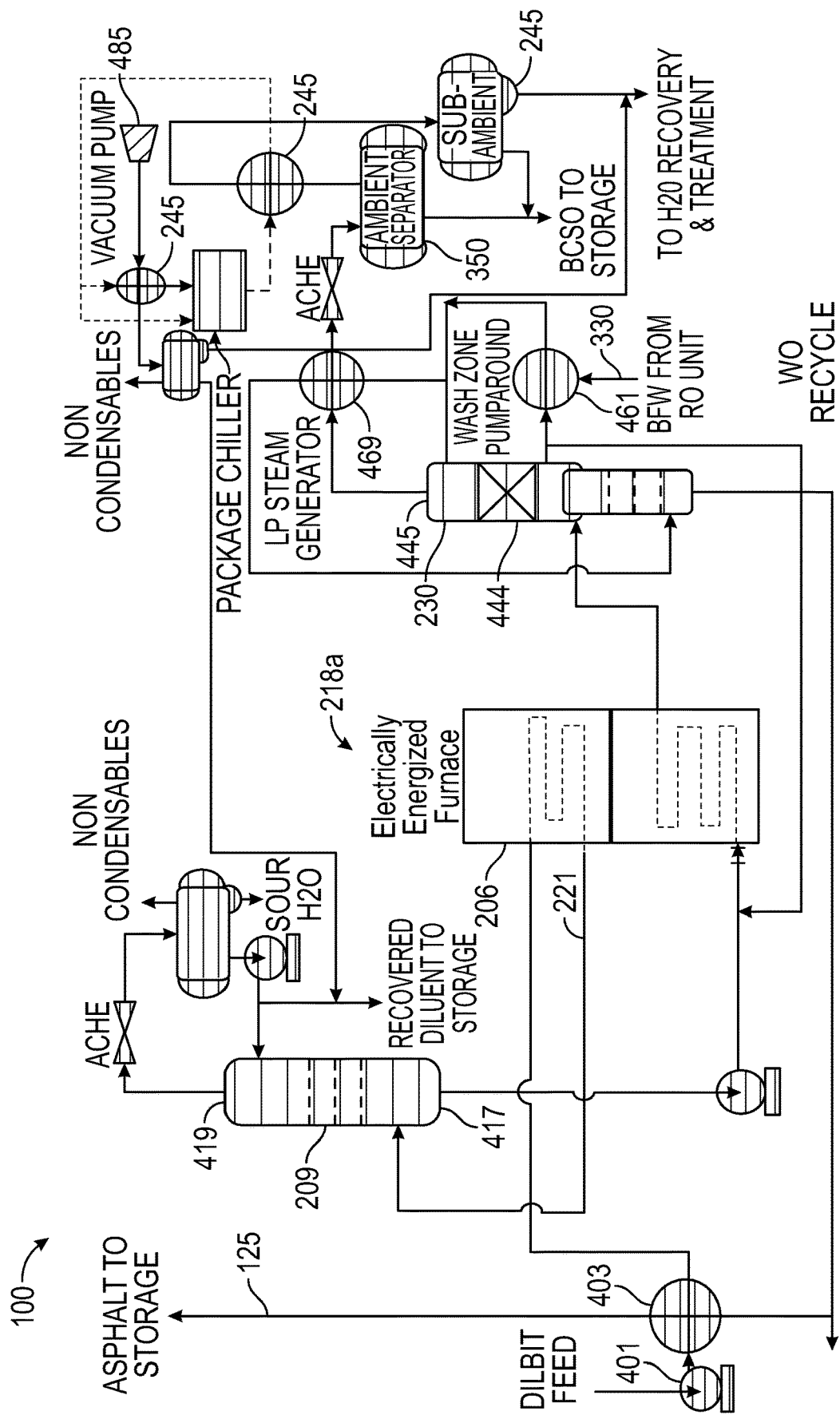
FIG. 7 depicts a schematic view of an exemplary hydrocarbon stream separation apparatus implementation illustrating exemplary feed preparation and asphalt separation subsystems configured with an electrically energized heater.

FIG. 7 depicts a schematic view of an exemplary hydrocarbon stream separation apparatus implementation illustrating exemplary feed preparation and asphalt separation subsystems configured with an electrically energized heater. In FIG. 7, the exemplary hydrocarbon stream separation system 100 comprises exemplary asphalt separation and feed preparation components described with reference to FIGS. 1-4, with the electrically energized heater 218a depicted by FIG. 7 replacing the fired heater 218 depicted at least by FIGS. 4 and 5. In contrast with the fired heater 218 depicted at least by FIGS. 2B, 2C, 4, and 5, which may be fueled by hydrocarbons such as natural gas, fuel oil and other volatile hydrocarbons, the exemplary electrically energized heater 218a depicted by FIG. 7 provides a heat input device that would reduce direct GHG emissions by an exemplary hydrocarbon stream separation implementation. In illustrative examples, a variety of heat transfer equipment energized by electricity may be used as the heat input device (electrically energized heater 218a or fired heater 218). Alternatively, recovered process heat could be injected into the process, as depicted and identified as device 218, at least in FIGS. 2B, 2C, 4, and 5 using non direct (Scope 1) emitting energy fuels and sources such as electricity, circulating heat transfer fluid such as a hot oil, or fuels such as ammonia, hydrogen, and other non-fossil carbon containing energy fuels or energy carriers, to inject heat. Using, for example, electrically energized equipment such as the depicted electrically energized heater 218a to inject additional heat as required into the preheated feed (206) and into heated feed (221) respectively, into the process in combination with recovered process heat, may eliminate direct GHG emissions by an exemplary implementation.

Although various features have been described with reference to the Figures, what is disclosed in summary is an exemplary hydrocarbon stream separation method comprising: flashing a hydrocarbon feed stream under vacuum using a vacuum separation column flash zone to form a non-volatile liquid and a remaining stream comprising an atmospheric hydrocarbon stream and a vacuum distillable hydrocarbon stream; condensing the atmospheric hydrocarbon stream to a liquid using a steam generator and a circulating liquid stream as heat sinks; cooling wash oil heated in a wash zone of the vacuum separation column using a wash oil pumparound cooler; recycling the cooled wash oil back to the vacuum separation column; condensing the vacuum distillable hydrocarbon stream using the steam generator; and cooling the condensed vacuum distillable hydrocarbon stream thereby making a by-product.

The hydrocarbon feed stream may further comprise bitumen.

The hydrocarbon feed stream may further comprise diluent.

The non-volatile liquid may further comprise asphalt.

The method may further comprise returning the recycled wash oil to the vacuum separation column wash zone or the vacuum separation column flash zone.

The method may further comprise using a temperature modulating valve to increase or decrease a temperature drop across the wash oil pumparound cooler while maintaining flow of wash oil in a wash oil pumparound circuit.

The method may further comprise producing controllable grade asphalt from the non-volatile liquid as a function of a temperature drop across the wash oil pumparound cooler, wherein the temperature drop across the wash oil pumparound cooler is adjusted by using the temperature modulating valve to control an amount of boiler feed water supplied to the wash oil pumparound cooler.

The non-volatile liquid may comprise an asphalt product.

The method may further comprise collecting and purifying the non-volatile liquid in a stripping section of the vacuum separation column.

The method may further comprise collecting the purified non-volatile liquid in a storage tank.

The method may further comprise generating steam from using the steam generator and injecting the steam generated into a stripping section of the vacuum separation column to control an initial boiling point (IBP) of the non-volatile liquid.

The method may further comprise controlling a steam injection rate using a valve and the non-volatile liquid comprises non-condensable vapor.

The method may further comprise condensing the injected steam using a two-stage condenser system to augment the vacuum, said two-stage condenser system comprising an ambient condenser operably coupled to a sub-ambient condenser.

The method may further comprise vacuum pumping the non-condensable vapor of the non-volatile vapor using a vacuum pump after condensing the steam and moderating vacuum levels using the vacuum pump to ensure a steam condensing envelope is upstream of the vacuum pump.

The method may further comprise vacuum pumping the remaining stream using a vacuum pump and moderating vacuum levels using the vacuum pump to ensure a steam condensing envelope is upstream of the vacuum pump.

The method may further comprise recovering water from the vacuum pumped remaining stream using a two-stage condenser system comprising an ambient condenser operably coupled to a sub-ambient condenser and transferring the recovered water to a water treatment system.

The method may further comprise recovering fuel from the vacuum pumped remaining stream using an atmospheric separator and burning the recovered fuel using a fired heater burner.

The method may further comprise recovering waste heat from the vacuum pumped remaining stream using a waste heat recovery section, said waste heat comprising process heat from the remaining stream.

The method may further comprise cooling the condensed vacuum distillable hydrocarbon stream using an ambient condenser to make the by-product.

The by-product may be a gasoil product.

The by-product may be Heavy Vacuum Gas Oil (HVGO).

Prior to flashing the hydrocarbon feed stream under vacuum using a vacuum separation column flash zone, the hydrocarbon feed stream may be flashed in a flash vessel at near atmospheric pressure using heat from a fired heater.

The method may further comprise preheating the hydrocarbon feed stream to a first preheated temperature using a heat exchanger with recovered process heat prior to flashing the hydrocarbon feed stream in the flash vessel at near atmospheric pressure.

The method may further comprise scrubbing entrained liquids and volatile vapors from the remaining stream using cool wash oil pumparound supplied to a wash zone of the vacuum separation column.

The amount of wash oil pumparound circulated back to the vacuum separation column wash zone may control an amount of heat removed from the wash oil.

Wash oil pumparound may condense vapor to a liquid in the vacuum separation column wash zone, wherein the condensed liquid is deposited on a wash oil tray disposed above the vacuum separation column flash zone to increase an amount of wash oil deposited on the wash oil tray.

Wash oil recycled to the vacuum separation column flash zone may be flashed in the vacuum separation column flash zone.

In another aspect, an exemplary hydrocarbon stream separation method in accordance with the teaching of the present disclosure may comprise: condensing an atmospheric hydrocarbon stream to a liquid using a steam generator (469) and a circulating liquid stream (461a) as heat sinks and condensing a vacuum distillable hydrocarbon stream using the steam generator (469), wherein the atmospheric hydrocarbon stream and the vacuum distillable hydrocarbon stream were separated from a hydrocarbon feed stream (401); and cooling the condensed vacuum distillable hydrocarbon stream thereby making a by-product (477).

The method may further comprise that the atmospheric hydrocarbon stream and the vacuum distillable hydrocarbon stream were separated from the hydrocarbon feed stream (401) by flashing the hydrocarbon feed stream (401) under vacuum using heat from an electrically energized heater (218*a*) and a vacuum separation column (230) flash zone (442) to form a non-volatile liquid (453) and a remaining stream (445) comprising the atmospheric hydrocarbon stream and the vacuum distillable hydrocarbon stream.

The hydrocarbon feed stream (401) may further comprise bitumen.

The hydrocarbon feed stream (401) may further comprise diluent.

The non-volatile liquid (453) may further comprise asphalt.

The method may further comprise cooling wash oil heated in a wash zone (444) of the vacuum separation column (230) using a wash oil pumparound cooler (461).

The method may further comprise recycling the cooled wash oil back to the vacuum separation column (230).

The method may further comprise returning the recycled wash oil to the vacuum separation column (230) wash zone (444) or the vacuum separation column (230) flash zone (442).

The method may further comprise using a temperature modulating valve (463) to increase or decrease a temperature drop across the wash oil pumparound cooler (461) while maintaining flow of wash oil in a wash oil pumparound circuit.

The method may further comprise producing controllable grade asphalt from the non-volatile liquid (453) as a function of a temperature drop across the wash oil pumparound cooler (461), wherein the temperature drop across the wash oil pumparound cooler (461) is adjusted by using the temperature modulating valve (463) to control an amount of boiler feed water supplied to the wash oil pumparound cooler (461).

The non-volatile liquid (453) may comprise an asphalt product.

The method may further comprise collecting and purifying the non-volatile liquid in a stripping section (443) of the vacuum separation column (230).

The method may further comprise collecting the purified non-volatile liquid in a storage tank.

The method may further comprise generating steam from using the steam generator (469) and injecting the steam generated into a stripping section (443) of the vacuum separation column (230) to control an initial boiling point (IBP) of the non-volatile liquid.

The method may further comprise controlling a steam injection rate (447) using a valve (449) and the non-volatile liquid comprises non-condensable vapor.

The method may further comprise condensing the injected steam (312) using a two-stage condenser system to augment the vacuum, said two-stage condenser system comprising an ambient condenser (324) operably coupled to a sub-ambient condenser (326).

The method may further comprise vacuum pumping the non-condensable vapor of the non-volatile vapor using a vacuum pump (485) after condensing the steam and moderating vacuum levels using the vacuum pump (485) to ensure a steam condensing envelope is upstream of the vacuum pump (485).

The method may further comprise vacuum pumping the remaining stream using a vacuum pump (485) and moderating vacuum levels using the vacuum pump (485) to ensure a steam condensing envelope is upstream of the vacuum pump (485).

The method may further comprise recovering waste heat from the vacuum pumped remaining stream using a waste heat recovery section (239), said waste heat comprising process heat from the remaining stream (445).

The method may further comprise cooling the condensed vacuum distillable hydrocarbon stream using an ambient condenser (324) to make the by-product (477), wherein the by-product (477) comprises a gasoil product further comprising Heavy Vacuum Gas Oil (HVGO).

The method may further comprise recovering water from the vacuum pumped remaining stream using a two-stage condenser system comprising an ambient condenser (324) operably coupled to a sub-ambient condenser (326) and transferring the recovered water (493) to a water treatment system (497).

The method may further comprise, wherein prior to flashing the hydrocarbon feed stream (401) under vacuum using the vacuum separation column (230) flash zone (442) the hydrocarbon feed stream (401) is flashed in a flash vessel (209) at near atmospheric pressure using heat from the electrically energized heater (218*a*).

The method may further comprise preheating the hydrocarbon feed stream (401) to a first preheated temperature (404) using a heat exchanger (403) with recovered process heat prior to flashing the hydrocarbon feed stream in the flash vessel (209) at near atmospheric pressure.

The method may further comprise scrubbing entrained liquids and volatile vapors (453) from the remaining stream (445) using cool wash oil pumparound (457) supplied to a wash zone (444) of the vacuum separation column (230).

The wash oil pumparound (457) may be circulated back to the vacuum separation column (230) wash zone (444) to regulate heat removal from the wash oil.

The wash oil pumparound (457) may condense vapor to a liquid in the vacuum separation column (230) wash zone (444), wherein the condensed liquid is deposited on a wash oil tray disposed above the vacuum separation column (230) flash zone (442) to increase an amount of wash oil deposited on the wash oil tray.

The wash oil recycled to the vacuum separation column (230) flash zone (442) may be flashed.

Although various features have been described with reference to the Figures, other features are possible. For example, a hydrocarbon stream separation implementation in accordance with the present disclosure may provide a vacuum flash process that produces a controllable grade of asphalt using a single vacuum separation column while eliminating the need for an atmospheric distillation column and excess steam added to the furnace to prevent coking and fouling. A hydrocarbon stream separation implementation in accordance with the present disclosure may provide a heavy oil vacuum process using a single vacuum separation column that minimizes fractionation and produces a single, full-range crude oil product that can be sold directly to refineries as a unique and valuable feedstock while minimizing energy requirements and environmental footprint. This single vacuum separation column, in a hydrocarbon stream separation implementation in accordance with the present disclosure, may be configured to produce up to three rough cut vacuum gas oils using the unique overhead condensation conditions of the tower rather than via side cut draws as is the case with conventional columns.

A hydrocarbon stream separation implementation, in accordance with the present disclosure, may provide a process that condenses steam which also generates vacuum conditions upstream of the vacuum/recompression step such that only a relatively small stream of non-condensable gases requires compression. A hydrocarbon stream separation implementation, in accordance with the present disclosure, may provide a process that specifically controls the amount of heat removed from the wash oil while minimizing the need to recycle the captured residuum product. A hydrocarbon stream separation implementation, in accordance with the present disclosure, may provide a vacuum process overhead system capable of condensing volatile hydrocarbons that are normally removed in an atmospheric distillation (fractionation) column. A hydrocarbon stream separation implementation, in accordance with the present disclosure, may provide a vacuum process overhead cooling system that can recover and reuse the energy back into the process, thereby minimizing rejected heat loads to ambient and improving energy efficiency.

In an illustrative example, a process is disclosed for separating a heavy hydrocarbon stream with or without an added diluent, comprising 1) heating and removing any added diluent at near atmospheric pressure, 2) heating and flashing the remaining stream under vacuum, 3) condensing a portion of the flashed vapor using a steam generator and a circulating liquid stream as heat sinks, 4) recycling a portion of the circulating liquid stream back to the vacuum flash zone, 5) condensing the remaining flashed hydrocarbon vapors in a steam generator followed by ambient temperature cooling to make an intermediate blend stock such as HVGO for the BCO, 6) using the steam generated to control the initial boiling point (IBP) of the non-volatile liquids exiting the process, 7) condensing the injected steam and lower molecular weight hydrocarbons using a two-stage condenser system to augment the vacuum, wherein the two-stage condenser system comprises an ambient condenser operably connected to a sub-ambient condenser (wherein "condenser" is used interchangeably with "heat sink"), 8) vacuum pumping only the remaining non-condensable vapors after condensing the steam and lighter hydrocarbons, and 9) moderating the level of vacuum required to ensure steam condensing envelope is upstream of the vacuum pump.

An exemplary implementation in accordance with the teaching of the present disclosure may use very hot HVGO to generate steam after preheating boiler feedwater using heat extracted from the overhead stream, as an alternative to or in combination with other techniques such as those described, for example, at least with reference to FIGS. 4-5, as using the overhead stream to generate the steam. In an illustrative example, such a method to use very hot HVGO to generate steam after preheating boiler feedwater using heat extracted from the overhead stream may comprise: flashing a hydrocarbon stream (401) under vacuum using a vacuum separation column (230) flash zone (442) to form a non-volatile liquid (453) and a remaining stream (445) comprising an atmospheric distillable hydrocarbon stream plus a vacuum distillable hydrocarbon stream; condensing the atmospheric distillable hydrocarbon stream to a liquid using cool boiler feed water as a heat sink prior to collecting the further cooled liquid atmospheric distillable hydrocarbon stream as an intermediate product; cooling wash oil heated in a wash zone using a heat recovery boiler to generate steam from the preheated boiler feed water and a sub cooled wash oil stream, which may be referred to as a heavy vacuum gasoil (HVGO); further sub-cooling the wash oil (i.e., HVGO) using a stabilizer reboiler then recycling the sub cooled wash oil back to the vacuum separation column to serve as a reflux stream; cooling the hot non-volatile liquid to create super-heated steam and/or higher-pressure steam prior to further cooling the hot non-volatile liquid using feed preheat exchangers before transferring the cooled non-volatile product to storage or other process application.

Although the principles set forth in this disclosure are directed toward the separation of diluted bitumen into valuable products, they are equally applicable to heavy crude oils for which diluents have not been added or may not need to be added to facilitate fluid transport.

In examples illustrative of implementations in accordance with the present disclosure, an exemplary process to remove diluent may be implemented by a Feed Preparation Unit (FPU). Exemplary stream separation may be implemented by an Asphalt Separation Unit (ASU). Product separation may occur in the ASU, where residue product (asphalt) specs are fixed, using stripping steam and wash oil. Heat and water may be recovered and reused throughout an exemplary process. Diluent may be recovered and refined in an FPU as well as in the stabilizer where diluent specifications are set. Other products may be recovered, such as light vacuum gasoil (LVGO) and medium vacuum gasoil (VGO). These gas oil streams can be comingled with the HVGO to form a pipeline-able bottomless crude oil, or they can be kept segregated and sold as specialty oil products.

An exemplary hydrocarbon stream separation implementation in accordance with the present disclosure may comprise at least two recycled streams in a vacuum column configuration: 1) a recycled wash oil stream (wash oil is heavy vacuum gas oil at approximately 230° C.); and 2) a recycled pumparound oil stream (pumparound oil is light to medium vacuum gas oil at approximately 120° C.). No diluent is used in this part of the process. In an illustrative example, the wash oil pumparound return temperature may vary from about 110° C. to above 200° C., depending on how much fractionation is desired in this section of the column.

An implementation in accordance with the present disclosure may comprise a flash column in the FPU, where diluent is removed, and a vacuum column in the ASU, where hydrocarbon streams are separated. The FPU is optional, depending on the presence or absence of diluent added to the incoming feedstock stream to improve transportability of the feedstock stream to the ASU. If no added diluent is present in the feedstock, the FPU is not needed. In some examples, diluent removal may be bypassed by valve upon a determination the feedstock is not diluted bitumen ("dilbit").

As used herein, the term "ambient" in context of the flash vessel refers to near ambient pressure. "Ambient" in this contest does not mean ambient temperature, just ambient pressure. The present disclosure also refers to ambient conditions in the vacuum tower overhead. In that context of the vacuum tower overhead, the term "ambient" refers to ambient temperature, not pressure.

As used herein, the term "ambient cooler" refers to any heat exchanger device that uses ambient air or water as the ultimate heat sink.

As used herein, the term "heat exchanger" refers to a physical device that allows one stream at a higher temperature to pass thermal energy to a stream at a lower temperature without physically having to mix the two streams.

As used herein, the terms "fired heater," "charge furnace," or "furnace" refer to a physical device that produces a hot flue gas from combusting a fuel gas with air for the purpose of heating some other stream. After the combustion with air takes place, the hot flue gas naturally rises vertically since it is less dense than the surrounding air. The energy release of the combusted flue has two forms: 1) radiant energy (light), and 2) thermal mass energy (temperature). The stream to be heated flows downward counter-currently thru the rising flue gas inside metal tubes, or "coil-sections." The first coil section at the top of the furnace, called the "convective section" is comprised of 2 types of tubes. Where the flue gas is relatively cooler, the tubes may have "fins" around the outside that increase the available surface area for heat transfer. As the flue gas gets hotter towards the point of combustion, the tubes do not have fins as the flue temperature is too hot. In view of this, the bottom part of the "convective section" may comprise simply bare tubes. Finally, below the convective section is the radiant section. Here, where the flue temperatures are hottest (>2,000° F.), heat transfer occurs both from thermal energy exchange and radiant energy exchange.

An exemplary fired heater implementation in accordance with the teachings of the present disclosure may be configured with the radiant and convective coil sections split. The cooler feed stream first flows thru the convective coil section and then leaves the heater. The "second temperature" provided by such an exemplary fired heater in accordance with the teachings of the present disclosure is a control-point that is variable by allowing some of the feed in the tubes to bypass the convective coil section. The actual temperature value of the total feed stream leaving the heater is determined by the operator based upon the type of diluent present in the incoming feed and is typically the minimum temperature required to vaporize all of the diluent's components. The hot convective coil outlet flows then to the first column where the diluent vapors are allowed to separate from the heavy oil charge. Once the diluent vapors are removed, the heavy oil charge goes back to the heater and is further heated in the radiant coil section.

In an implementation in accordance with the present disclosure, the vacuum separation column has several components or zones in the column. Feed from the FPU (hot bitumen) enters the "flash zone" of the column. Hot vapors (recall, the asphalt does not vaporize) rise up the column entraining residue (asphalt) as an aerosol. The wash zone and structural packing are used to wash valuable asphalt out of the vapors. This may result in condensed vapors getting into the asphalt product and impairing asphalt quality. To remove these condensed vapors steam is injected in the stripping zone of the column at the bottom of the column but above the liquid asphalt in the bottom of the column to "strip" the condensed vapors from the asphalt. This is the stripping zone of the vacuum column.

An implementation in accordance with the present disclosure may provide a method of separating atmospheric distillable material and vacuum distillable material in one column rather than typical configurations consisting of an atmospheric distillation column and a vacuum distillation column, and in some cases also an atmospheric pre-flash column. The present disclosure combines an atmospheric column (and usually a dedicated atmospheric column furnace) and a vacuum furnace/vacuum distillation column into one column and furnace. This is achieved using a novel vacuum column overhead system capable of processing vacuum gas oils and also the atmospheric gas oils that are normally removed in an atmospheric column.

In an illustrative example, vacuum gas oils have high dew points, even under vacuum conditions. This property allows vacuum gas oils to be condensed at ambient temperatures using air, water, or other cooling medium at ~ambient temperatures while under negative pressure (gauge), i.e., vacuum. Light hydrocarbons, if present, do not condense at ambient temperatures while under vacuum. That is why light hydrocarbons are normally removed in an atmospheric distillation system before entering the vacuum system. The present disclosure solves that problem, and by extension eliminates the need for an atmospheric distillation system by reducing the temperature of the stream exiting the ambient cooling section of the system to below the dew point of the ambient cooled stream constituents.

Steam ejectors are normally used in petroleum vacuum distillation columns to pull the vacuum gas oil vapors out of the vacuum column and route the hot vapors laden with steam to a cooling system. Collapsing the ambient (temperature) condensable components from a vapor phase (high volume) to a liquid phase (low volume) generates some of the required vacuum for the system. Remaining vapors, (primarily water aka steam) are then routed to a relatively large vacuum compressor which provides additional vacuum and raises the steam pressure to slightly above ambient which enables the steam to be condensed to form wastewater using ambient temperature-based cooling systems. Vacuum ejector steam requirements plus motive steam and stripping steam exceed the amount of steam than can be generated using available heat sources within the vacuum distillation system. This means steam must be imported into the vacuum distillation system, usually from an external steam header charged with steam from steam generators external to the vacuum unit.

By contrast with such conventional designs, an implementation in accordance with the present disclosure may eliminate the need for steam ejectors as well as the need for an atmospheric distillation system. This occurs by taking advantage of light hydrocarbons that are present as a result of eliminating the atmospheric distillation system so that steam from the stripping section of the vacuum column can be condensed by reducing the stream temperature to below their dew point while under vacuum, notionally approximately 0° C., using a chiller system, an ambient cooler or sub-ambient cooler. In one embodiment, the present disclosure teaches sub cooling the ambient cooled vapors exiting the ambient cooling section of the process to below the component dew point, to cause the high-volume light hydrocarbon and water vapors to condense to liquids (low volume) which in turn augments the system vacuum requirements.

Eliminating steam ejectors in accordance with the teaching of the present disclosure reduces oil contaminated steam condensate production. This contaminated steam condensate is normally processed in a secondary wastewater treatment plant. Generating vacuum using ambient and/or sub-ambient cooling eliminates this source of wastewater.

Eliminating steam ejectors in accordance with the teaching of the present disclosure eliminates the need for energy, usually fossil fuel, to generate the steam required by the ejectors and by extension, the GHG and conventional air pollutants associated with generating the steam.

Not fractionating into sharp cut streams in accordance with the teaching of the present disclosure saves energy and emissions. An implementation in accordance with the teaching of the present disclosure may save capital and operating cost while reducing complexity relative to conventional atmospheric and vacuum distillation processes which are equipped with several pump around and reflux circuits side draws, side cut strippers and ancillary equipment. A process in accordance with the teachings of the present disclosure, through various implementations, may be configured to produce a blended pipeline-able crude oil and specification asphalt as well as other residuum-based products.

An implementation in accordance with the teachings of the present disclosure may be configured to produce three rough cut liquid product streams in addition to specification residuum-based products. No additional energy or complexity is required to produce the three rough-cut streams. The capability to produce the rough-cut streams is a consequence of using ambient cooling sometimes followed by sub-ambient cooling, not as a result of side cut draws/side cut strippers/reflux/pumparound circuits as is the case with typical crude distillation units. Vacuum gas oils under vacuum conditions are condensed using ambient temperatures. This condensed vacuum gas oil may be blended with other condensed hydrocarbons to form a pipeline-able crude oil or may be segregated as a marketable stream.

Lighter hydrocarbon gas oils typically removed in an atmospheric distillation column, pass through the ambient cooler along with steam from the stripping section of the column and motive steam, if added, as vapors. Rather than use an exceptionally large and expensive vacuum pump to render the vapors condensable, the present disclosure teaches using ambient and/or sub-ambient cooling. The condensed light hydrocarbons and steam condensate are routed to a separator where the light hydrocarbons are removed from the steam condensate (water). This light hydrocarbon liquid stream may be blended with other condensed hydrocarbons to form a pipeline-able crude oil or be segregated as a marketable stream. The third product is heavy vacuum gas oil, the wash oil stream. The wash oil may be blended with other condensed hydrocarbons to form a pipeline-able crude oil or be segregated as a marketable stream. Note, there is a fourth liquid hydrocarbon stream, diluent. If diluent is part of the feed stream (as in dilbit) the diluent is removed in the flash vessel and is segregated as a marketable light naphtha stream.

Steam ejectors are commonly used in vacuum tower overhead systems to draw vapors out of the top of the vacuum column hence creating bulk vacuum in the column. To meet the steam demand for ejectors as well as motive steam and stripping steam, steam is imported into the crude distillation unit. This imported steam is generated in an external steam plant, or multiple steam generating equipment within a large and/or complex facility. In accordance with the teaching of the present disclosure, steam ejectors are not used, no side cut stripping steam is required and the process is designed to operate without motive steam. Since the steam requirements for implementations in accordance with the teachings of the present disclosure have been minimized, there is enough available process heat in process to generate enough steam to meet all the process requirements. The primary steam requirement is the stripping zone of the vacuum column. An exemplary implementation in accordance with teachings of the present disclosure may be self-sufficient in steam.

In some implementations in accordance with the teachings of the present disclosure, addition of atmospheric condensable hydrocarbons plus the large amount of steam associated with a conventional vacuum column design may lead to an impractically large vacuum pump. In the present disclosure, this issue is resolved by using ambient plus sub-ambient cooling. Ambient cooling results in condensing the low vapor pressure components of vacuum tower overhead volatile material and delivers a low vapor pressure liquid, analogous to a rough-cut medium vacuum gas oil. Condensing these low vapor pressure materials from vapor to liquid results in a contribution to 'bulk vacuum' in the vacuum column. The balance of the more difficult to condense vapors under vacuum conditions, steam, and more volatile hydrocarbons (hydrocarbons that would normally be removed in an atmospheric distillation column), are routed to a sub-ambient temperature cooler. This cooler reduces the temperature of the vapors, light hydrocarbons, and water, to their dew point (condensation temperature) to cause these vapors to condense. The collapsing water and hydrocarbon vapors further contribute to the system bulk vacuum and significantly reduces the size requirements of the vacuum pump compared to conventional processes that use steam ejectors.

In an implementation in accordance with the present disclosure's teachings, the steam generator may be located in the process in the overhead system taking advantage of the heat content in the overhead vapors. Alternatively, the steam generator may be configured to take heat from the heavy vacuum gas oil, or the wash oil. Either configuration, or a combination, could be used to make most effective use of the available heat to generate dry saturated and superheated steam to meet all process requirements for steam and potentially excess steam that could be exported out of the process, for example to generate electricity to augment the process's electrical requirements.

An implementation in accordance with the present disclosure may use a single vacuum distillation column to separate residuum products, such as asphalt, from heavy crude oil. Normally this is done using two towers, an atmospheric distillation column and a vacuum distillation column plus all the ancillary equipment associated with each column. The configuration described in this disclosure that permits distillation of extra heavy crude oil (for example bitumen, but not limited to bitumen) in one column rather than two columns thus provides a substantial advance in hydrocarbon stream separation technology.

In an illustrative example, a conventional refinery atmospheric and vacuum distillation process may be equipped with expensive and complex to operate equipment to achieve separation of crude oil into its components. In contrast, an implementation according to the teachings of the present disclosure is directed to recovering residue product from the bottom of the vacuum column containing properties and characteristics established by residuum markets. Conventional crude distillation unit design and practice is to separate and recover lighter hydrocarbons that can be distilled/fractionated under nominal atmospheric pressure in part so that the design of the vacuum column and its overhead systems do not need to handle the atmospheric distillable components of the crude oil.

For example, a conventional vacuum distillation process is designed to operate without atmospheric distillable products in the atmospheric tower "long residue" (i.e., vacuum tower feed). In an exemplary scenario illustrating deficiencies of conventional systems, in the event atmospheric distillable material passes into the vacuum tower feed the vacuum system would lose vacuum, the overhead system would be flooded with light material and the vacuum gas oil products would go off spec. A lot of steam is required to separate the crude oil into its component fractions. Steam is also used in significant quantities to create vacuum (ejectors) as well as motive steam injected into the furnace to prevent coking and for stripping. This results in a lot of steam in the vacuum overhead system that needs to be condensed and handled as oil contaminated water.

In contrast with conventional systems, implementations in accordance with the present disclosure may eliminate substantial equipment and cost. For example, the present disclosure teaches designs that feature an overhead system designed to process lighter, atmospheric distillable hydrocarbons, removes material that is normally removed in an atmospheric distillation process, and minimizes steam requirements, which in turn reduces the compressor or vacuum pump size and energy requirements, and need to condense unnecessary steam in the overhead system.

To minimize the size of the vacuum pump, sub ambient temperature cooling is used to condense steam and light hydrocarbons (normally removed in an atmospheric distillation section of the crude unit) under vacuum conditions. Since the water is almost quantitatively removed in the ambient and/or sub-ambient cooling section of the vacuum column overhead the size, capacity, and power requirements of the vacuum pump are minimized. Exemplary implementations in accordance with the teachings of the present disclosure also use a unique vacuum tower design and overhead system permitting asphalt to be recovered and extracted from crude oil without first fractionating the crude oil into is components.

Some designs according to the present disclosure completely eliminate the atmospheric fractionator and minimize fractionation in the vacuum tower. This can be done by completely redesigning the overhead system to allow recovery of the atmospheric distillable material at low pressure and minimize steam inputs. Some implementations take advantage of lower dew point (boiling point) properties of water and light hydrocarbons when under vacuum. This is done by lowering the temperatures of the steam and light hydrocarbons to their dew point and below while under vacuum. Doing so not only allows recovery of these more volatile components but collapsing the vapors into liquid phase supplements vacuum conditions and minimizes the size of the vacuum pump.

Bulk vacuum in a conventional design is created using steam ejectors followed by ambient cooling of the hydrocarbons and steam. Cooling the steam and hydrocarbon vapors collapses the vapors (water and hydrocarbon) and creating bulk vacuum. Non-condensable vapors at the overhead system pressures (vacuum) are then routed to a large vacuum pump which compresses the steam and hydrocarbon vapors to ambient pressures allowing the cooled vapors to be condensed while trimming or controlling, the vacuum in the vacuum column to desired levels. An implementation in accordance with the teachings of the present disclosure may minimize the size and cost of the vacuum pump because the system was designed to minimize steam requirements, that is, eliminate need for steam ejectors. Minimizing the amount of steam in the system and condensing the minimal amount of steam that is in the system using sub-ambient cooling results in a much smaller vacuum pump. This works with smaller vacuum pump sizes because the atmospheric condensable hydrocarbons were removed in the atmospheric distillation column and steam ejectors are eliminated.

In an illustrative example, vacuum distillation columns typically have zones, or sections within the column. These zones are not separate columns. An implementation in accordance with the teachings of the present disclosure may have the flash zone where the feed is admitted. Volatile hydrocarbons rise up from the flash zone into the wash zone where entrained non-volatile material is removed from the vapors. Below the flash zone is the stripping zone where steam is used to remove volatiles from the non-volatile residuum as the liquid residuum drops into the bottom of the column.

Although the present disclosure mentions a second column, the second column referred to here is a flash vessel, configured for diluent removal in a feed preparation unit (FPU). As further described herein, the FPU (and the flash vessel therein) is optional, and only needed when the feed contains diluent, that is, diluted extra heavy oil, for example dilbit. One purpose of the flash column (flash vessel) in the FPU is to remove and recover diluent from the feed. The recovered diluent is not injected, added, or otherwise re-introduced into an exemplary hydrocarbon stream separation process after being removed from the system, in accordance with the teachings of the present disclosure.

In an illustrative example, at 760 mmHg (a), water vapor will begin condensing below 212° F. As the pressure falls below 760 mmHg(a), vacuum conditions, the condensation temperature falls. At vacuum pressures around 100 mmHg (a), the condensing temperature of water vapor approaches ambient temperature (80-90° F.). However, at very low vacuum pressures (10-20 mmHg(a)), water vapor will require very cool sub-ambient temperatures to condense (<32° F.), which essentially means it is non-condensable. Typical asphalt processes require very high vacuum levels to meet AET specs. By contrast, an implementation in accordance with the teachings of present disclosure may meet AET specs without requiring the high level of vacuum other asphalt process require. Consequently, an implementation in accordance with the teachings of the present disclosure may use ambient conditions to condense the water vapor. For example, by condensing the water vapor under vacuum conditions using ambient temperatures, a significant reduction in energy requirements of the vacuum equipment required to make the asphalt can be achieved.

In an illustrative example, since fluids require a pressure differential to force movement thru piping systems, the pressure at the inlet to the furnace must be higher than the pressure at the furnace outlet. The actual pressure at the inlet to the furnace tubing may be determined during detailed design once the geometries of the heater furnace tubing and the physical properties of the feed charge are known. In accordance with the teachings of the present disclosure, the pressure in the steam generator may be increased if steam injection into the inlet of the heater should be desired by the operator based on the particular "recipe" needed to make sellable asphalt from a given feedstock. Normally, steam injection into the heater inlet is not needed and generator pressure can be near ambient pressure since the only steam injection point will be the stripper chamber, which may operate at vacuum pressures. The lower the steam generator pressure is maintained, the cooler the process gases exiting will be.

In an illustrative example, the stripping section of an exemplary vacuum separation column in accordance with the teaching of the present disclosure may be a chamber of much smaller diameter and height than the wash grid section that is positioned below the wash grid. This chamber has a bottom outlet nozzle where the liquid asphalt exits the system and bottom inlet nozzle where steam is injected. Some form of grid or trays fill the chamber to promote effective mixing of the rising steam vapor and the falling liquid asphalt.

In an illustrative example, a wash grid is a plurality of planar structures spaced-apart and vertically stacked inside of an enclosure such that liquid flowing downward from the top by gravity better mixes with gases flowing upward from the bottom of the grid. The physical structure of the grid forces the liquid phase to disperse into smaller droplets as it falls thru the enclosure. The smaller the droplets, the more surface area is available for mass and energy transfer between the phases. There are two physical processes going on inside the wash grid: 1) mass transfer and 2) energy transfer. By sub-cooling the liquid phase slightly, meaning a liquid that is not at its boiling point, the liquid will have capacity to absorb the energy transfer without being fully evaporated. The extent of sub-cooling here is one of the control-points for an exemplary process in accordance with the teachings of the present disclosure. Excessive sub-cooling condenses more of the incoming hot vapors, which increases energy costs since that condensed liquid will have to be recycled back to the furnace inlet to be re-vaporized. Too little sub-cooling and the hot vapors will just boil-off the liquid. Without a stable liquid phase on the grid, throughout the wash grid, the process will not function as intended.

In an illustrative example of a conventional distillation column, "product" liquid streams are removed from the top and bottom. A sub-cooled portion of the top liquid stream must be added back to the column to provide a liquid phase for the "equilibrium stages." Otherwise, the column would only contain vapor and no separation of the compounds would occur as desired. In the case of distilling LPG from gasoline, for example, 3-4 times the rate of LPG product removed from the top must be returned back to the column as liquid to achieve the required separation. By contrast, the separation is much easier, and the least amount of overhead liquid needs to be returned to the column (a minimal portion) in an implementation in accordance with the teachings of the present disclosure, as a result of the wide disparity in boiling point between the bitumen and the diluent.

In an illustrative example, most asphalt today comes from crude oil that has been pre-processed in 1) an atmospheric distillation column (to remove light-boiling compounds) and 2) a vacuum column (to remove heavier-boiling compounds. In step 2, operators typically push the operating temperatures so high (called the severity) that they have to fight against coking in the furnace (like adding copious amounts of steam into the furnace coils). By contrast, an implementation in accordance with the present disclosure may make asphalt without requiring step 1 and does not need the degree of severity that cokes conventional furnaces.

In an illustrative example, if a liquid phase were just poured onto the top of the wash grid at a single point in space, the vertical dimension of the grid would have to be much longer for the grid's structural elements to naturally disperse the liquid throughout the cross-section. However, if one were to pour the liquid onto the top of the grid at many points in space, the wash grid can be as effective at a smaller physical distance (vertically). The most effective way to do this would be to create an array of nozzles spaced symmetrically over the top of the wash grid and all connected to a pressurized liquid source.

In an illustrative example, an equilibrium stage is the condition where all further energy and mass transfer between the vapor and liquid phases has been achieved and both phases are at substantially the same temperature (this is a simplification of reality as mass and energy are transferred between the vapor and liquid phases in a continuum with the rising vapor phase always at a slightly higher temperature than falling liquid phase). In practice, for one of ordinary skill designing distillation columns using metal trays, an "equilibrium stage" may require about 24 inches of vertical space where the liquid and vapor are in physical contact.

In an illustrative example, a "total-draw" tray is a physical capture point for all of the liquid that falls out of the grid structure. This tray also has a plurality of openings through which a vapor phase can pass up into the wash grid. Typically, these openings, or vents, are capped with roof-shaped coverings which prevent liquid falling from above from falling into the openings.

In an example illustrative of implementations in accordance with the present disclosure, an exemplary hydrocarbon stream separation apparatus may be cold-started by a process including steps similar to 1) Route boiler feed water to the steam generator; 2) Route stored VGO to the unit; 3) Light the furnace; 4) Ramp up temperatures in the unit and return the VGO to storage via the asphalt draw and the HVGO draw; and 5) start the vacuum pump. In this cold-start example, when temperatures approach normal, begin adding dilbit to the VGO startup stream and reduce VGO flow. During this step the asphalt and VGO stream will be routed to slop for reprocessing. An exemplary cold-start process may continue increasing dilbit content and reducing VGO content until VGO startup flow is zero.

Typically, the removal of light hydrocarbons at atmospheric pressure is preferred since these compounds are condensable at ambient conditions. If allowed to enter a vacuum system, they are difficult to condense and may require enlargement of the vacuum vessels, overhead condensing systems, vacuum pump, and piping to accommodate their physical volumes. For this reason, a typical crude oil distillation (aka fractionation) unit may be comprised of two distillation columns. The first column fractionates and removes hydrocarbons that can be vaporized and are condensable under ambient conditions. Heavier hydrocarbon components have boiling points that are above their coking temperatures. To avoid coking the long residue exiting the atmospheric column is heated to near coking temperatures and then admitted to the second distillation column operating under vacuum. At the reduced pressure and elevated, and near coking, temperature, the volatile material in the vacuum column feed flashes to a vapor state. Hydrocarbons of higher molecular weight are condensable under vacuum conditions, so optimal sizing of the vacuum environment is predicated on removing non-condensable vapors under conditions in the vacuum column overhead in the upstream atmospheric column.

However, subjecting even non-volatile hydrocarbons to the vacuum environment often creates mechanical entrainment of liquid droplets with the flashing vapor phase. If the non-volatile hydrocarbons are a valuable product from the process, then recovering them back to the liquid product phase is desirable. One means to recapture the non-volatile droplets is to spray a liquid phase down upon the vapor mass rising from the flash zone across a structural gridwork or similar structure that promotes contact between the vapor and liquid phases, the wash zone.

A typical wash grid only requires a few equilibrium stages to capture most or practically all of the entrained non-volatile liquids, so they are relatively inexpensive to build and operate. To provide the liquid spray stream to knock down the entrained droplets, some condensation of the vapor phase is required. In most systems, a cooled starting oil is added at first to condense a portion of the hot vapors rising from the flash zone. The condensed liquids are recovered through a draw tray above the vacuum flash zone. These hot recovered liquids are then pumped through a heat sink, cooled, and a portion is sent back to the wash zone sprayers to continue knocking down aerosol non-volatiles from the flash zone.

However, because the overflash non-volatiles captured represent potentially lost residuum product and may carry undesired contaminates into lighter recovered fractions, they often require some recycling back to the feed heater or slumping into the residuum product. In the production of asphalt, slumping is generally less desired since slumping lowers one of the primary product specifications, the AET or flash point. Recycling back to the furnace inlet adds load and decreases overall energy efficiency. Therefore, condensation of these liquids in the wash grid needs to be carefully controlled. Only the minimum amount of liquid pumparound needed to wet the wash grid is desired. The traditional rule-of-thumb for minimum liquid wetting to cover a structural grid packing is near 2 gpm/sq.ft. of column cross-sectional area. Therefore, the temperature drop between the flash zone/heater outlet and the vapors exiting the wash grid is an important control point for residuum product loss and overall process energy efficiency.

Wash zone vapors that are not condensed can exit and be fully condensed into a second valuable product. Under the traditional refinery model, the vacuum column has additional fractionation/pumparound zones above the wash zone that further separate these vapors into heavy and light fractions. However, such additional fractionation sections are not necessary if a single, full-boiling range crude oil product is desired or if only rough gas oil cuts are desired. By producing a valuable full-range pipeline-able crude oil product substantially void of residuum and associated contaminants from a single bed (that is, a single wash zone bed configured with structural packing), significant cost can be eliminated coupled with energy efficiency improvement compared to traditional refining processes.

Under typical vacuum tower conditions, the added steam to produce the desired residuum AET specification is not condensable at ambient conditions. This steam separates from the condensed hydrocarbons and is normally compressed to atmospheric pressures through a mechanical compressor or steam ejector system in order to be condensed back to a liquid and recovered. In most vacuum systems there is also a fraction of air that leaks into the vacuum environment that also passes through the compression process. A significant cost factor in operating a vacuum system containing steam relates to moving and condensing this steam load along with handling the entrained air.

For the residuum product, for example asphalt, the primary means of quality control are the atmospheric equivalent temperature (AET) (flash point), penetration value and/or viscosity. The AET represents the temperature of the residue (asphalt) at the bottom of the vacuum column if the process were at atmospheric pressure. This temperature is an indication of the boiling point (at atmospheric pressure assuming coke formation was not an issue) of the volatile hydrocarbons that have been allowed to slump into the non-volatile liquids. Different grades of asphalt may have different AET specifications. The addition of a rate of steam into the non-volatile liquids exiting the flash zone is effective at controlling the AET of the residuum. In the production of asphalt, the AET is a primary unit specification.

In the traditional refinery model, the vacuum column charge furnace is operated at maximum temperatures subject to the coking limits, which fouls the heater tubes with carbon deposits. Motive steam is typically added into the oil feed to the charge heater to increase tube velocities, which tends to deter carbon fouling at high heating rates by reducing the time the oil is exposed to coking temperatures. This velocity steam as well as the stripping steam used to control the AET of the residuum, the condensation load of all the injected steam becomes a significant economic factor in the overall operation of the process. Also, the deepest achievable vacuum may be applied so as to lift as much volatile hydrocarbons out of the residuum as possible. However, in the production of asphalt, such severity of heating and vacuum is generally not required to produce on-spec product.

In an illustrative example, an implementation in accordance with the teachings of the present disclosure may achieve self-sufficiency in steam production. For example, all steam required by such a process may be generated through waste heat capture from the process. No investment in a standalone steam-producing boiler is required, as a result of lower steam demand within an exemplary process. For example a design in accordance with the teachings of the present disclosure may opt for the use of a small package chiller and vacuum compressor, instead of steam jet ejectors, lowering overall energy consumption and water use.

In an illustrative example, an implementation in accordance with the teachings of the present disclosure may start with a heavy feedstock from tankage. If the feedstock is diluted bitumen or heavy crude, the feedstock may be stored at near-ambient conditions. If the feedstock is undiluted bitumen, the feedstock may be stored at 50-80° C. to ensure pumpability. The feed may be pumped to the preheat section of the Feed Prep Unit (FPU) where the feed absorbs heat from the pumparound heat exchanger first, then from the asphalt product heat exchanger. From the asphalt product heat exchanger, the feed can absorb final trim heating from the convection section of the fired heater. The trim heating controls are such that more or less trim heat is added by bypassing less or more flow around the convection section, subject to a minimum convection section flow constraint. To satisfy both FPU flash column feed temperature and minimum convection section flow, the preheat can be adjusted through/around the preheat exchanger.

After final trim heating, the feed may enter the FPU flash column where the heated feed partially flashes to vapor. Diluent components may be recovered overhead via an overhead condenser, which is a total condenser supplying reflux to the FPU flash column and un-stabilized diluent product. The feed from the bottom of the FPU flash column is sent to the radiant section of the fired heater where further heat is absorbed prior to entering the flash zone of the Asphalt Separation Unit (ASU) vacuum column.

Undiluted bitumen and heavy crude feed may be fed to the process. In this operating mode, the FPU column and downstream stabilization equipment may be bypassed, sending the undiluted feed first to the convection section of the fired heater, then directly to the radiant section.

In an example illustrative of various implementations in accordance with the teachings of the present disclosure, a single fired heater may comprise a vertical cylindrical furnace with a radiant coil, shield tubes, convection section and an economizer coil. Based on the combined duty of radiant+convection section, the thermal efficiency may be 87%. This efficiency may be enhanced to 90% by adding the economizer coil, which heats glycol for tank heating and tracing. Consistent with the operation of a high efficiency furnace the flue gas is supplied with CO and $O_2$ analyzers to ensure both complete combustion and low excess air.

Given the high asphaltene content of oil sands bitumen, an exemplary implementation in accordance with the teachings of the present disclosure may take advantage of the comparatively low ASU temperatures required to meet the PG grades of interest. For example, ASU flash zone temperatures may be in the 350° C. range, and fired heater transfer lines may be designed at near sonic velocity. This results in little to no thermal cracking in the circuit, and the ability to operate the furnace without velocity steam. Operating at a vacuum overhead pressure of 100 mmHg instead of 60 mmHg without signs of thermal cracking may permit condensing more water out of the circuit prior to the vacuum compressor.

In an illustrative example, an exemplary ASU vacuum separation column (i.e., flash vessel) may be divided into 4 zones. The flash zone is where the liquid/vapor feed mixture enters the vessel and separates, the majority of the liquid falling into the stripping zone while the flashed vapor (and any entrained liquid) rises into the grid wash zone. The flash zone utilizes an enhanced vapor horn device and a combination of anti-swirl baffles and turning vanes to facilitate high performance vapor/liquid disengaging. Vapor entering the grid wash zone is contacted with HVGO grid wash liquid from the pumparound circuit. Entrained metals and non-volatile components are "washed" back down the column onto a spent wash draw tray, where the liquid is collected and recycled back to the fired heater and ASU feed. The wash grid must always be "wetted" and liquid well distributed to aid de-entrainment and avoid coking.

In an illustrative example, the vapor leaving the grid wash zone travels to the pumparound section of the flash vessel. Using structured packing, the vapor is contacted with cooled pumparound liquid which enters the tower near the top of the vessel. Some of the vapor is condensed and travels back down the tower, where the liquid condensed from the vapor is re-vaporized from hotter vapor. This refluxing creates some separation of components, which are removed from the tower at the pumparound draw. The material removed is called HVGO. The pumparound circuit may exchange heat by preheating feed, re-boiling the diluent stabilizer, and most importantly generating steam.

In an illustrative example, the stripping section may be trayed and receives its feed as liquid from the flash zone. The liquid is stripped of lighter vapors using stripping steam which is added near the bottom of the vessel. The use of stripping steam not only makes the front end of the asphalt cut heavier, but it also raises the asphalt flash point, which is a product specification. To maintain control of asphalt quality, an analyzer may be deployed that can be correlated with tests such as penetration. The analyzer reading may be controlled using two manipulated variables: stripping steam rate and fired heater outlet temperature.

In an illustrative example low pressure steam comprising ASU stripping steam at 1361 kg/hr (3,000 lb/hr), and Deaerator steam at 75 kg/hr (165 lb/hr) may be generated in a pumparound waste heat boiler. About 1500 kg/hr of Boiler Feed Water (BFW) may be used. The majority of the BFW is sourced from recycled water via the water treatment system. The process water from the FPU overhead, ASU overhead and the tanklot is de-oiled, stripped of residual H2S, then filtered in cartridge filters prior to BFW pre-treatment and deaeration. After treatment the BFW is heated with condensing ASU overhead vapor.

In an illustrative example, quality of asphalt product may be inferred from on-line analyzer measurement and control. Fired heater outlet temperature may be at least one manipulated variable governing quality of asphalt product.

In illustrative examples in accordance with the teachings of the present disclosure, an implementation may replace steam jet ejectors and barometric condensers with a vacuum compressor. The water vapor load in the ASU overhead circuit however becomes a key factor in the sizing of that vacuum compressor, even without velocity steam in the furnace. Upstream of the compressor, conventional ambient cooling alone would not have been able to condense enough water vapor out of the stream, especially in the summer months. To cool the stream further, a sub-ambient cooling medium was employed using a refrigeration system and chilled circulating glycol. This design feature significantly downsizes the vacuum compressor, and the power requirements for running the vacuum compressor. Further power savings are also captured at the refrigeration unit in the shoulder seasons via exemplary process control features.

In some implementations, an ambient separator drum (with both hydrocarbon and water pumps) followed by a sub-ambient separator drum (with similar pumps) may be combined into a single drum with a liquid seal separating the ambient compartment from the sub-ambient compartment. This configuration forces the vapor in/out of one side of the drum, through the sub-ambient condenser, and then in/out of the other side of the drum. The end result is a single drum with one hydrocarbon and one water draw from the drum: two pumps operating instead of four.

In an illustrative example, an FPU implementation may achieve reduced energy input requirements using a simple flash column with 10 trays. This facilitation may be a result of recovering in the back end of the ASU condensing circuit any diluent material not recovered in the FPU. Here, the vacuum compressor discharge stream is routed to an aerial cooler and separator drum where both diluent and water drop out of the vent gas stream leaving the non-condensable for destruction in the fired heater burners.

In examples illustrative of various implementations in accordance with the present disclosure, an implementation may separate residue from feed without fractionating any of the other crude constituents. In some examples, rough fractions may be recovered from the two-stage condensing system. Separation of the residue from the heavy crude may yield a valuable, pipeline-able bottomless crude oil by-product. In some examples, a simple separator may use heat, vacuum, and a two-stage overhead condensing system, comprising ambient and sub-ambient cooling. Some implementations may permit some amount of atmospheric distillable material (conventionally produced in an atmospheric fractionator) to be handled in a vacuum separator along with vacuum distillates and capacity to maintain vacuum even with atmospheric gas oils present, all in one simple separator unit. Some implementations may permit a design that does not need cooling water, is self-sufficient in steam, and does not need a desalter, a sulfur recovery unit, or intermediate product tanks. Some designs may minimize capital equipment requirements, and simplify operations, while minimizing GHG and conventional pollutant emissions. Some implementations may produce a residue that may be used for asphalt, coker feed, residue hydro conversion unit feed, base stock for coatings, sealants, adhesives, even lube base stocks, depending on the feedstock. Some implementations may be flexible enough to process almost any heavy crude oils, even crude oils diluted with a light material (dilbit) to allow transport by pipeline. Some designs may permit processing bitumen diluted to enable pumping through a pipeline, enabling flashing off of the diluent to create diluent free heavy crude oil.

In the Summary above and in this Detailed Description, and the Claims below, and in the accompanying drawings, reference is made to particular features of various implementations. It is to be understood that the disclosure of particular features of various implementations in this specification is to be interpreted to include all possible combinations of such particular features. For example, where a particular feature is disclosed in the context of a particular aspect or implementation, or a particular claim, that feature can also be used—to the extent possible—in combination with and/or in the context of other particular aspects and implementations, and in an implementation generally.

While multiple implementations are disclosed, still other implementations will become apparent to those skilled in the art from this detailed description. Disclosed implementations may be capable of myriad modifications in various obvious aspects, all without departing from the spirit and scope of the disclosed implementations. Accordingly, the drawings and descriptions are to be regarded as illustrative in nature and not restrictive.

It should be noted that the features illustrated in the drawings are not necessarily drawn to scale, and features of one implementation may be employed with other implementations as the skilled artisan would recognize, even if not explicitly stated herein. Descriptions of well-known components and processing techniques may be omitted so as to not unnecessarily obscure the implementation features.

In the present disclosure, various features may be described as being optional, for example, through the use of the verb "may;" or, through the use of any of the phrases: "in some implementations," "in some designs," "in various implementations," "in various designs," "in an illustrative example," or, "for example." For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be implemented in seven different ways, namely with just one of the three possible features, with any two of the three possible features or with all three of the three possible features.

In the present disclosure, the term "system" may be interchangeably used with the term "apparatus" or the term "machine." In the present disclosure, the term "method" may be interchangeably used with the term "process." In various implementations, elements described herein as coupled or connected may have an effectual relationship realizable by a direct connection or indirectly with one or more other intervening elements.

While various implementations have been disclosed and described in detail herein, it will be apparent to those skilled in the art that various changes may be made to the disclosed configuration, operation, and form without departing from the spirit and scope thereof. In particular, it is noted that the respective implementation features, even those disclosed solely in combination with other implementation features, may be combined in any configuration excepting those readily apparent to the person skilled in the art as nonsensical. Likewise, use of the singular and plural is solely for the sake of illustration and is not to be interpreted as limiting.

In the present disclosure, all descriptions where "comprising" is used may have as alternatives "consisting essentially of," or "consisting of." In the present disclosure, any method or apparatus implementation may be devoid of one or more process steps or components. In the present disclosure, implementations employing negative limitations are expressly disclosed and considered a part of this disclosure.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The phrases "connected to," "coupled to" and "in communication with" refer to any form of interaction between two or more entities, including mechanical, electrical, magnetic, electromagnetic, fluid, or thermal interaction. Two components may be functionally coupled to each other even though they are not in direct contact with each other. The terms "abutting" or "in mechanical union" may refer to items that are in direct physical contact with each other, although the items may not necessarily be attached together.

The word "exemplary" is used herein to mean "serving as an example, instance, or illustration." Any implementation described herein as "exemplary" is not necessarily to be construed as preferred over other implementations. While various aspects of the disclosure are presented with reference to drawings, the drawings are not necessarily drawn to scale unless specifically indicated.

Reference throughout this specification to "an implementation" or "the implementation' means that a particular feature, structure, or characteristic described in connection with that implementation is included in at least one implementation. Thus, the quoted phrases, or variations thereof, as recited throughout this specification are not necessarily all referring to the same implementation.

Similarly, it should be appreciated that in the above description, various features are sometimes grouped together in a single implementation, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects may lie in a combination of fewer than all features of any single foregoing disclosed implementation. Thus, the claims following this Detailed Description are hereby expressly incorporated into this Detailed Description, with each claim standing on its own as a separate implementation. This disclosure is intended to be interpreted as including all permutations of the independent claims with their dependent claims.

A hydrocarbon stream separation system or method implementation in accordance with the present disclosure may be accomplished through the use of one or more computing devices. For example, one of ordinary skill in the art would appreciate that an exemplary control system or algorithmic controller appropriate for use with implementation in accordance with the present application may generally comprise one or more of a Central processing Unit (CPU) also known as a processor, Random Access Memory (RAM), a storage medium (for example, hard disk drive, solid state drive, flash memory, cloud storage), an operating system (OS), one or more application software, a display element, one or more communications means, or one or more input/output devices/means.

An exemplary control system may use any of the disclosed hydrocarbon stream separation methods or system operations and may combine an implementation of one or more disclosed steps of said methods or system operations into an algorithmic controller. The hydrocarbon stream separation algorithmic controller may improve redundancy throughout an exemplary hydrocarbon stream separation system or method implementation. The algorithmic controller may also permit improved reliability and efficiency. The algorithmic controller may furthermore ensure the constant and high quality of asphalt product, any other product, or by-product. In an example illustrative of various implementations in accordance with the present disclosure, an exemplary hydrocarbon stream separation control system may be configured to operate, activate, deactivate, adjust, or communicate via sensors, wiring, piping, controls, or valves with various control, communication, or processing devices or systems that may be adapted to implement any of the disclosed methods. The controller may be a digital processor that continuously reads the hydrocarbon stream separation system's instruments and computes outputs to the control elements.

An exemplary hydrocarbon stream separation control system may implement all or a portion of any of the disclosed methods with or without processor-executable program instructions executed by one or more CPU. Examples of computing devices usable with implementations of the present disclosure include, but are not limited to, proprietary computing devices, embedded computing devices, personal computers, mobile computing devices, tablet PCs, mini-PCs, servers, or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and implementation of the present disclosure are contemplated for use with any computing device.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an implementation may include an alternate order of the steps adapted to a particular application of a technique disclosed herein. All such variations and modifications are intended to fall within the scope of this disclosure. The depiction and description of steps in any particular order is not intended to exclude implementations having the steps in a different order, unless required by a particular application, explicitly stated, or otherwise clear from the context.

The respective reference numbers and descriptions of the elements depicted by the Drawings are summarized as follows:

- 100 hydrocarbon stream separation system
- 105 asphalt separation unit (ASU)
- 110 feed preparation unit (FPU)
- 115 recovery unit (RU)
- 120 undiluted feed inlet
- 125 product outlet
- 130 vacuum overhead stream
- 135 mixed by-product outlet
- 140 water recovery and reuse
- 145 waste heat recovery and reuse
- 150 RU diluent return
- 155 diluted feed inlet
- 160 FPU diluent return
- 203 preheat section
- 206 preheated feed
- 209 flash vessel
- 212 undiluted bitumen stream
- 215 diluent stream
- 218 fired heater
- 218a electrically energized heater
- 221 heated feed
- 224 fuel inlet
- 227 steam inlet
- 230 vacuum separation column
- 236 heavy vacuum gas oil (HVGO) stream outlet
- 239 waste heat recovery
- 242 ambient condenser and separation
- 245 sub-ambient condenser and separation
- 248 vacuum compressor
- 251 condenser and final recovery
- 254 vacuum overhead vapor and condensed liquids
- 257 vacuum overhead ambient cooled vapor
- 260 vacuum overhead sub-ambient cooled vapor
- 263 vacuum overhead compressed vapor
- 266 steam outlet
- 269 wide cut mixed by-product stream
- 272 fuel gas stream
- 275 glycol-cooled condenser and separation
- 278 gly-col-chilled condenser and separation
- 281 vacuum overhead glycol-cooled vapor
- 284 vacuum overhead glycol-chilled vapor
- 287 HVGO stream from ASU
- 290 heated boiler feed water (BFW) outlet
- 293 light vacuum gas oil (LVGO) stream outlet
- 296 atmospheric gas oil (AGO) stream outlet
- 302 grid wash zone
- 304 flash zone
- 306 stripping zone
- 308 wash oil pumparound cooler
- 310 wash oil pumparound circuit
- 312 stripping steam
- 314 HVGO pumparound (PA) zone
- 316 HVGO pumparound cooler
- 318 HVGO pumparound circuit
- 320 HVGO pumparound steam generation
- 322 HVGO stream from vacuum separation column
- 324 ambient condenser
- 326 sub-ambient condenser
- 327 warm glycol
- 328 refrigeration unit
- 329 chilled glycol
- 330 BFW inlet
- 332 ambient condenser fan
- 334 compressor aftercooler
- 336 compressor aftercooler fan
- 338 heated BFW stream from RU
- 340 glycol-cooled condenser
- 342 glycol-chilled condenser
- 344 cooled glycol
- 346 warm glycol return
- 348 chilled glycol
- 349 condenser and separation
- 350 ambient separator
- 352 sub-ambient condenser
- 354 sub-ambient separator
- 356 combined ambient/sub-ambient separator
- 358a ambient separator hydrocarbon pump 358b ambient separator water pump
358c sub-ambient separator hydrocarbon pump
358d sub-ambient separator water pump
358e combined hydrocarbon pump
358f combined water pump
401 oil feed source
403 heat exchanger
404 heat exchanger outlet temperature
405 product rundown stream
407 product rundown stream temperature
409 heat exchanger bypass valve
411 fired heater convective coil section
413 fired heater radiant coil section
415 flash column inlet temperature
417 flash column liquid phase
419 flash column vapor phase
420 flash column fractionation equilibrium stages
421 atmospheric condenser
423 atmospheric reflux drum
425 diluent storage tank
427 diluent reflux
429 diluent reflux control valve
431 trim heat control bypass valve
433 feed oil two-phase stream
435 burner control valve
437 burner supplemental fuel
439 burner system
441 flash zone heated feed oil inlet
442 flash zone
443 stripping section
444 wash zone
445 remaining stream/by-product stream/wash zone vapor phase
447 stripping column steam inlet rate
449 stripping column steam inlet control valve
451 stripping column internal structures
453 overflash entrained liquids and volatile vapors
455 wash zone internal structures
457 cooled liquid phase (pumparound return)
459 overflash recycle to ASU feed
461 wash oil pumparound cooler
461a circulating liquid stream
463 wash zone outlet control valve
465 velocity steam to heater inlet
467 wash zone vapor phase outlet
469 overhead steam generator
471 steam generator boiler feed water inlet
473 stripping column steam inlet
475 leak air
477 ambient condensed liquid product
479 BFW storage tank
481 make-up water
483 Reverse Osmosis (RO) unit
485 residual vapor stream vacuum compressor
487 ambient separator oil phase outlet
489 gas oil storage tank
491 vacuum compressor discharge separator
493 secondary recovered water stream
495 primary recovered water stream
497 water treatment system
499 residual non-condensable vapors
600 steam vapor pressure as a function of temperature
605 saturated steam vapor pressure
610 exclusively steam region
615 condensed water and steam region A number of implementations have been described. Nevertheless, it will be understood that various modifications may be made. For example, the steps of the disclosed techniques may be performed in a different sequence, components of the disclosed systems may be combined in a different manner, or the components may be supplemented with other components. Accordingly, other implementations are contemplated, within the scope of the following claims.

What is claimed is:

1. A method comprising:
condensing an atmospheric hydrocarbon stream to a liquid using a steam generator (469) and a circulating liquid stream (461a) as heat sinks and condensing a vacuum distillable hydrocarbon stream using the steam generator (469), wherein the atmospheric hydrocarbon stream and the vacuum distillable hydrocarbon stream were separated from a hydrocarbon feed stream (401); and
cooling the condensed vacuum distillable hydrocarbon stream thereby making a by-product (477).

2. The method of claim 1, wherein the atmospheric hydrocarbon stream and the vacuum distillable hydrocarbon stream were separated from the hydrocarbon feed stream (401) by flashing the hydrocarbon feed stream (401) under vacuum using heat and a vacuum separation column (230) flash zone (442) to form a non-volatile liquid (453) and a remaining stream (445) comprising the atmospheric hydrocarbon stream and the vacuum distillable hydrocarbon stream.

3. The method of claim 2, wherein the heat is provided by an electrically energized heater (218a).

4. The method of claim 1, wherein the hydrocarbon feed stream (401) further comprises bitumen.

5. The method of claim 1, wherein the hydrocarbon feed stream (401) further comprises diluent.

6. The method of claim 2, wherein the non-volatile liquid (453) further comprises asphalt.

7. The method of claim 2, wherein the method further comprises cooling wash oil heated in a wash zone (444) of the vacuum separation column (230) using a wash oil pumparound cooler (461).

8. The method of claim 7, wherein the method further comprises recycling the cooled wash oil back to the vacuum separation column (230).

9. The method of claim 8, wherein the method further comprises returning the recycled wash oil to the vacuum separation column (230) wash zone (444) or the vacuum separation column (230) flash zone (442).

10. The method of claim 7, wherein the method further comprises using a temperature modulating valve (463) to increase or decrease a temperature drop across the wash oil pumparound cooler (461) while maintaining flow of wash oil in a wash oil pumparound circuit.

11. The method of claim 10, wherein the method further comprises producing controllable grade asphalt from the non-volatile liquid (453) as a function of a temperature drop across the wash oil pumparound cooler (461), wherein the temperature drop across the wash oil pumparound cooler (461) is adjusted by using the temperature modulating valve (463) to control an amount of boiler feed water supplied to the wash oil pumparound cooler (461).

12. The method of claim 2, wherein the non-volatile liquid (453) comprises an asphalt product.

13. The method of claim 2, wherein the method further comprises collecting and purifying the non-volatile liquid in a stripping section (443) of the vacuum separation column (230).

14. The method of claim 13, wherein the method further comprises collecting the purified non-volatile liquid in a storage tank.

15. The method of claim 2, wherein the method further comprises generating steam from using the steam generator (469) and injecting the steam generated into a stripping section (443) of the vacuum separation column (230) to control an initial boiling point (IBP) of the non-volatile liquid.

16. The method of claim 15, wherein the method further comprises controlling a steam injection rate (447) using a valve (449) and the non-volatile liquid comprises non-condensable vapor.

17. The method of claim 15, wherein the method further comprises condensing the injected steam (312) using a two-stage condenser system to augment the vacuum, said two-stage condenser system comprising an ambient condenser (324) operably coupled to a sub-ambient condenser (326).

18. The method of claim 16, wherein the method further comprises vacuum pumping the non-condensable vapor of the non-volatile vapor using a vacuum pump (485) after condensing the steam and moderating vacuum levels using the vacuum pump (485) to ensure a steam condensing envelope is upstream of the vacuum pump (485).

19. The method of claim 2, wherein the method further comprises vacuum pumping the remaining stream using a vacuum pump (485) and moderating vacuum levels using the vacuum pump (485) to ensure a steam condensing envelope is upstream of the vacuum pump (485).

20. The method of claim 19, wherein the method further comprises recovering waste heat from the vacuum pumped remaining stream using a waste heat recovery section (239), said waste heat comprising process heat from the remaining stream (445).

* * * * *